(12) United States Patent
Shi et al.

(10) Patent No.: US 10,873,931 B2
(45) Date of Patent: Dec. 22, 2020

(54) DOWNLINK CONTROL METHOD AND APPARATUS

(71) Applicant: ZTE CORPORATION, Guangdong (CN)

(72) Inventors: Jing Shi, Guangdong (CN); Shuqiang Xia, Guangdong (CN); Wei Gou, Guangdong (CN); Bo Dai, Guangdong (CN); Qian Dai, Guangdong (CN)

(73) Assignee: ZTE Corporation, Guangdong (CN)

( * ) Notice: Subject to any disclaimer, the term of this patent is extended or adjusted under 35 U.S.C. 154(b) by 82 days.

(21) Appl. No.: 15/761,074

(22) PCT Filed: Aug. 10, 2016

(86) PCT No.: PCT/CN2016/094388
§ 371 (c)(1),
(2) Date: Mar. 16, 2018

(87) PCT Pub. No.: WO2017/045496
PCT Pub. Date: Mar. 23, 2017

(65) Prior Publication Data
US 2018/0310282 A1    Oct. 25, 2018

(30) Foreign Application Priority Data

Sep. 18, 2015 (CN) .......................... 2015 1 0599120

(51) Int. Cl.
*H04W 72/04* (2009.01)
*H04L 5/00* (2006.01)
*H04L 27/26* (2006.01)

(52) U.S. Cl.
CPC ......... *H04W 72/042* (2013.01); *H04L 5/0053* (2013.01); *H04L 5/0092* (2013.01);
(Continued)

(58) Field of Classification Search
None
See application file for complete search history.

(56) References Cited

U.S. PATENT DOCUMENTS 6,967,970 B2 * 11/2005 Terry ................ H04W 52/0238
370/458
7,274,681 B2 * 9/2007 Oki ...................... H04B 7/2656
370/345
(Continued)

FOREIGN PATENT DOCUMENTS

CN    102017693 A    12/2014
CN    104247313 A    12/2014
(Continued)

OTHER PUBLICATIONS

U.S. Appl. No. 62/201,735, filed Aug. 6, 2015, Fig. 7 and p. 15, "System and Method for Ultra-Reliable and Low Latency Communications for RRC Idle UE for 5G", Xiong et al.*
(Continued)

*Primary Examiner* — Gregory B Sefcheck
(74) *Attorney, Agent, or Firm* — Knobbe, Martens, Olson & Bear, LLP

(57) ABSTRACT

A downlink control method and apparatus are disclosed. The method includes: a base station determining at least one downlink control channel in a first downlink control channel and a second downlink control channel, including: determining to use the second downlink control channel in a short transmission time interval (TTI) which is out of a scheduling range of the first downlink control channel, or determining the downlink control channel used in the short TTI according to pre-definition or system configuration information; and the base station transmitting downlink control information (DCI) by using the determined downlink control channel.

11 Claims, 7 Drawing Sheets

(52) U.S. Cl.
CPC ........ *H04L 5/0094* (2013.01); *H04L 27/2602* (2013.01); *H04L 5/0007* (2013.01); *H04W 72/0446* (2013.01)

(56) References Cited

U.S. PATENT DOCUMENTS

| | | | |
|---|---|---|---|
| 7,894,345 B2* | 2/2011 | Kojima | H04L 47/822 370/235 |
| 9,282,567 B2* | 3/2016 | Golitschek Edler von Elbwart | H04B 7/2656 |
| 9,591,618 B2* | 3/2017 | Shi | H04W 28/16 |
| 9,705,654 B2* | 7/2017 | Ahmadi | H04L 5/0053 |
| 9,781,738 B2* | 10/2017 | Pietraski | H04W 72/1263 |
| 9,814,040 B2* | 11/2017 | Bhushan | H04L 1/1812 |
| 9,844,072 B2* | 12/2017 | Chen | H04L 5/0007 |
| 10,320,473 B2* | 6/2019 | Kim | H04B 7/26 |
| 10,361,836 B2* | 7/2019 | Lee | H04W 72/1273 |
| 10,455,503 B2* | 10/2019 | Lee | H04W 52/0216 |
| 10,555,301 B2* | 2/2020 | Li | H04L 5/0044 |
| 2009/0290559 A1* | 11/2009 | Pelletier | H04L 1/189 370/336 |
| 2011/0032894 A1 | 2/2011 | Miki et al. | |
| 2011/0244859 A1* | 10/2011 | Tsuda | H04W 36/245 455/436 |
| 2013/0058282 A1 | 3/2013 | Miki et al. | |
| 2014/0071954 A1 | 3/2014 | Au et al. | |
| 2014/0226607 A1 | 8/2014 | Holma et al. | |
| 2015/0351093 A1 | 12/2015 | Au et al. | |
| 2017/0318564 A1* | 11/2017 | Lee | H04L 1/00 |
| 2017/0325164 A1* | 11/2017 | Lee | H04W 52/0216 |
| 2018/0007673 A1* | 1/2018 | Fwu | H04W 4/70 |
| 2018/0145818 A1* | 5/2018 | Choi | H04L 5/0007 |
| 2018/0192420 A1* | 7/2018 | Hao | H04W 72/0446 |
| 2018/0227958 A1* | 8/2018 | Xiong | H04W 72/0406 |
| 2019/0081745 A1* | 3/2019 | Qin | H04L 1/1812 |
| 2019/0089511 A1* | 3/2019 | Saito | H04W 28/06 |

FOREIGN PATENT DOCUMENTS

| | | |
|---|---|---|
| CN | 104620629 A | 5/2015 |
| EP | 2816858 A1 | 12/2014 |

OTHER PUBLICATIONS

International Search Report dated Oct. 28, 2016 for International Application No. PCT/CN2016/094388, 5 pages.
Written Opinion of the International Searching Authority dated Oct. 28, 2016 for International Application No. PCT/CN2016/094388, 3 pages.
Office Action of corresponding Chinese Patent Application No. 201510599120.2—4 pages (dated May 2, 2018).

* cited by examiner

| SCCE0 | SCCE1 |
|---|---|
| SCCE2 | SCCE3 |

| SCCE0 | SCCE1 | SCCE0 | SCCE1 |
|---|---|---|---|
| SCCE2 | SCCE3 | SCCE2 | SCCE3 |
| SCCE0 | SCCE1 | SCCE0 | SCCE1 |
| SCCE2 | SCCE3 | SCCE2 | SCCE3 |

| SCCE0 |
|---|
| SCCE1 |
| SCCE2 |
| SCCE3 |

US 10,873,931 B2

DOWNLINK CONTROL METHOD AND APPARATUS

CROSS REFERENCE TO RELATED APPLICATIONS

This application is the U.S. National Phase Application under 35 U.S.C. § 371 of International Application No. PCT/CN2016/094388 filed on Aug. 10, 2016, designating the U.S. and published as WO 2017/045496 A1 on Mar. 23, 2017, which claims the benefit of Chinese Patent Application No. 201510599120.2, filed on Sep. 18, 2015, which are hereby incorporated by reference in their entirety.

TECHNICAL FIELD

The present disclosure relates to, but is not limited to, the field of communications, and particularly to a downlink control method and apparatus.

BACKGROUND

With increasing perfection of commercial use of a 4G (the 4th Generation mobile communication technology) LTE (Long-Term Evolution)/LTE-Advance/LTE-A (Long-Term Evolution Advance) system, a requirement for a technical index of the next-generation mobile communication technology, namely, 5G (the 5th Generation mobile communication technology) is higher and higher. It is generally believed in the industry that the next-generation mobile communication system should have characteristics such as ultrahigh speed, ultrahigh capacity, ultrahigh reliability and ultralow delay transmission. The currently recognized ultralow delay index in a 5G system is that an air interface delay is on a magnitude order of about 1 millisecond.

In the related art, a method for effectively realizing the ultralow delay is to sufficiently shorten a processing delay unit by shortening a TTI (Transmission Time Interval) of an LTE system, so as to support the above demand for the characteristic of the air interface delay of 1 millisecond. There are two methods for shortening the TTI in the related art. One method is to shorten a duration of a single OFDM (Orthogonal Frequency Division Multiplexing) symbol by increasing a subcarrier spacing of an OFDM system, and the method is involved in both a high-frequency communication system and an ultra-dense network of the 5G. The other method is, as discussed in the 3GPP (3rd Generation Partnership Project), to reduce a time domain length (may also be referred to as a time duration) of the TTI by reducing the number of OFDM symbols in the single TTI, and the method has an advantage of complete compatibility with the LTE system.

In the related art, a PDCCH (Physical Downlink Control Channel) in the LTE system occupies a resource region of former 0 to 4 OFDM symbols in a system bandwidth, and an EPDCCH (Enhanced Physical Downlink Control Channel) uses a part of resource regions of a PRB (Physical Resource Block) in a PDSCH (Physical Downlink Shared Channel). For a subframe of the TTI with the time domain length of 1 millisecond, a shortened TTI containing fewer OFDM symbols is used as a short TTI with a new granularity, but a downlink control channel cannot well support the short TTI with the new granularity in the related art.

SUMMARY

Embodiments of the present disclosure provide a downlink control method and apparatus, which may solve at least a use problem of a downlink control channel in a short TTI containing fewer OFDM symbols, and guarantee a low delay communication demand.

The embodiment of the present disclosure employs the following technical solution.

A downlink control method includes the following steps.

A base station determines at least one downlink control channel in a first downlink control channel and a second downlink control channel by. The determining includes the following steps: determining to use the second downlink control channel in a short transmission time interval (TTI) which is out of a scheduling range of the first downlink control channel, or determining the downlink control channel used in a short TTI according to pre-definition or system configuration information.

The base station transmits downlink control information (DCI) by using the determined downlink control channel.

Alternatively, the pre-definition or system configuration information indicates a case where all short TTIs use the second downlink control channel. The case where all the short TTIs use the second downlink control channel includes at least one of the following: all the short TTIs using the second downlink control channel, a part of the short TTIs using the second downlink control channel, or all the short TTIs not using the second downlink control channel.

Alternatively, a part of the short TTIs using the second downlink control channel includes at least one of the following cases: except that the first short TTI or former P short TTIs do not use the second downlink control channel, the remaining short TTIs use the second downlink control channel; except that the first short TTI or former Q short TTIs do not use the second downlink control channel, a part of the remaining short TTIs uses the second downlink control channel; or, the first short TTI uses the second downlink control channel, and a part of the subsequent short TTIs uses the second downlink control channel. Each of P and Q is an integer which is larger than 1 and smaller than R, and R is the number of the short TTIs included by a TTI with a time domain length of 1 millisecond.

Alternatively, a time domain length of the short TTI is predefined or notified by a signaling. The signaling includes any one or more of the following: system information block (SIB) information, a radio resource control (RRC) message or a physical layer signaling. The physical layer signaling includes at least one of the DCI or control format indication (CFI).

Alternatively, the first downlink control channel is a physical downlink control channel (PDCCH), and the second downlink control channel is a short physical downlink control channel (SPDCCH). The short TTI is a TTI a time domain length of which is smaller than 1 millisecond. The SPDCCH refers to a physical downlink control channel which occupies a part or all of resource elements within the short TTI and has a time domain length being smaller than or equal to the time domain length of the occupied short TTI.

Alternatively, the DCI is used for notifying a terminal of a corresponding traffic receiving way, and the traffic receiving way includes at least one of: when the DCI of the terminal is located in the PDCCH, receiving a traffic at the first short TTI or receiving a traffic at the TTI with the time domain length of 1 millisecond.

Alternatively, the SPDCCH, within the short TTI where the SPDCCH is located, uses resource elements within the short TTI with a short physical downlink shared channel (SPDSCH) according to any one of the following resource multiplexing ways: time division multiplexing, frequency division multiplexing, code division multiplexing, or time frequency division multiplexing. The SPDSCH refers to a physical downlink shared channel which occupies a part or all of the resource elements within the short TTI and has a time domain length being smaller than or equal to the time domain length of the occupied short TTI.

Alternatively, when the short TTI has a length of a single OFDM symbol, the SPDCCH and the SPDSCH perform resource multiplexing within the short TTI in a frequency division multiplexing way or a code division multiplexing way. The frequency division way includes the followings: interlacing to use resources of a single OFDM symbol by taking a single resource element (RE) or X REs as a unit, where X is a positive integer larger than 1; or using all or a part of even REs or even RE groups for the SPDCCH, and using the remaining REs or RE groups for the SPDSCH, where one RE group includes X REs; or using all or a part of odd REs or odd RE groups for the SPDCCH, and using the remaining REs or RE groups for the SPDSCH, where one RE group includes X REs.

Alternatively, the SPDCCH performs resource occupancy by taking a short control channel element (SCCE) as a granularity in an SPDCCH region within the short TTI. A distribution way of SCCEs in the SPDCCH region includes any one of the following: time frequency division occupancy, interlaced occupancy, frequency division occupancy, time division occupancy, or code division occupancy. The SCCE is a control channel element a time domain length of which is smaller than or equal to the time domain length of the short TTI.

Alternatively, information carried by the SPDCCH includes any one or more of the following: uplink grant (UL grant), downlink grant (DL grant), uplink and downlink joint grant (UL and DL grant), single-terminal acknowledgement/negative acknowledgement feedback information (ACK/NACK), or multi-terminal acknowledgement/negative acknowledgement feedback information (ACK/NACK).

Alternatively, resources, except for a PDCCH region, in a subframe are used by terminals with different delay demands according to a frequency division multiplexing way; or, resources in different subframes or radio frames are used by terminals with different delay demands according to a time division multiplexing way.

Alternatively, at least one of the PDCCH or the SPDCCH is in the same short TTI with scheduled downlink data information.

Alternatively, the determining to use the second downlink control channel in the short TTI which is out of a scheduling range of the first downlink control channel includes: when the time domain length of the short TTI is larger than or equal to the time domain length of the PDCCH, determining that the SPDCCH is used in one or more short TTIs behind the first short TTI containing the PDCCH; and when the time domain length of the short TTI is smaller than the time domain length of the PDCCH, determining that the SPDCCH is used in one or more short TTIs behind a PDCCH region.

Alternatively, the method further includes the following steps. The base station transmits feedback information for transmission correctness of a physical uplink shared channel (SPUSCH) of the short TTI by using a short physical hybrid automatic repeat indicator channel (SPHICH) in the short TTI using the SPDCCH. The SPHICH refers to a physical hybrid automatic repeat indicator channel which occupies all or a part of resource elements in the short TTI and has a time domain length being smaller than or equal to the time domain length of the occupied short TTI, and the SPUSCH refers to a physical uplink shared channel which occupies all or a part of resource elements in the short TTI and has a time domain length being smaller than or equal to the time domain length of the occupied short TTI.

The SPHICH performs puncturing transmission in the resources occupied by the SPDCCH, or the SPHICH performs transmission by using a part of resources independent from the resources occupied by the SPDCCH.

Alternatively, a size of a RBG serving as a granularity of resource allocation (RA) used by scheduling the short TTI is larger than or equal to a size of a RBG used by scheduling the TTI with the time domain length of 1 millisecond under a same system bandwidth.

Alternatively, a way of determining a transport block size (TBS) configuration table used by scheduling the short TTI includes: according to a proportion Y of the time domain length of the short TTI to 1 millisecond, multiplying a TBS in a predetermined TBS configuration table by Y, where 0%<Y<100%; and rounding up or down of the product to obtain the TBS in the TBS configuration table used by scheduling the short TTI.

Alternatively, when the time domain length of the short TTI is 0.5 millisecond, the PDCCH schedules downlink (DL) traffic channels in even short TTIs, the SPDCCH schedules DL traffic channels in odd short TTIs; and the PDCCH and the SPDCCH schedule uplink (UL) traffics of a subframe n+k, k is any one of the following: 2, 4 or 8, and n is a serial number of the current subframe.

Alternatively, the method further includes the following step. The base station transmits feedback information for transmission correctness of the SPUSCH of the odd short TTIs by using the SPHICH in the odd short TTIs.

Alternatively, at least one of the PDCCH or the SPDCCH is located in same or different short TTIs with the scheduled downlink data information.

The determining the downlink control channel used in the short TTI according to the pre-definition or system configuration information includes: determining that, in the subframe behind the TTI where the PDCCH is located, each short TTI does not use the SPDCCH, or a part of TTIs uses the SPDCCH, or all the short TTIs use the SPDCCH.

Alternatively, the method further includes the following steps. The base station uses the SPHICH in the short TTI which does not contain the PDCCH or in the short TTI outside the PDCCH region. When there is the SPDCCH in the short TTI, the SPHICH performs puncturing transmission in the resources occupied by the SPDCCH, or the SPHICH performs transmission by using a part of resources independent from the resources occupied by the SPDCCH. When there is no SPDCCH in the short TTI, the SPHICH performs transmission by using a part of resources independent from the resources occupied by the SPDSCH, or the SPDSCH carries information of joint encoding feedback information for transmission correctness of the SPUSCH of the short TTI with downlink data of the same terminal and transmits the information.

Alternatively, the determining the downlink control channel used in the short TTI according to the pre-definition or system configuration information includes: when the time domain length of the short TTI is 0.5 millisecond, determining that the SPDCCH is not used; and determining whether the SPDSCH occupies even short TTIs or odd short TTIs according to 1 bit predetermined in the DCI in the PDCCH; and when a subframe, the time domain length of which is 1 millisecond, includes x short TTIs, indicating that data scheduled by the SPDCCH or PDCCH is located in one or more short TTIs in the subframe by using m bits in the DCI in the SPDCCH or PDCCH, where x is a positive integer, and m≤x.

Alternatively, the method further includes the following steps. When the time domain length of the short TTI is 0.5 millisecond, the base station uses the SPHICH in the odd short TTIs, where the SPHICH only carries feedback information for transmission correctness of the SPUSCH of the odd short TTIs. When the subframe, the time domain length of which is 1 millisecond, includes x short TTIs, the base station uses the SPHICH in all the short TTIs or the short TTIs except the first short TTI in the subframe, the time domain length of which is 1 millisecond, where the SPHICH only carries feedback information for transmission correctness of the SPUSCH of all the short TTIs or the short TTIs except the first short TTI in the subframe, the time domain length of which is 1 millisecond.

A downlink control method includes the following steps. A terminal determines at least one downlink control channel in a first downlink control channel and a second downlink control channel. The determining includes: determining to use the second downlink control channel in a short transmission time interval (TTI) which is out of a scheduling range of the first downlink control channel; or determining the downlink control channel used in a short TTI according to pre-definition or system configuration information. The terminal receives downlink control information (DCI) by using the determined downlink control channel.

Alternatively, the pre-definition or system configuration information indicates a case where all short TTIs use the second downlink control channel. The case where all the short TTIs use the second downlink control channel includes at least one of the following: all the short TTIs use the second downlink control channel, a part of the short TTIs uses the second downlink control channel, or all the short TTIs do not use the second downlink control channel.

Alternatively, the case where a part of the short TTIs uses the second downlink control channel includes at least one of the following cases: except that the first short TTI or former P short TTIs do not use the second downlink control channel, the remaining short TTIs use the second downlink control channel; except that the first short TTI or former Q short TTIs do not use the second downlink control channel, a part of the remaining short TTIs uses the second downlink control channel; the first short TTI uses the second downlink control channel, and a part of the subsequent short TTIs uses the second downlink control channel. Each of P and Q is an integer which is larger than 1 and smaller than R, and R is the number of the short TTIs included by the TTI with a time domain length of 1 ms.

Alternatively, a time domain length of the short TTI is predefined or notified by a signaling. The signaling includes any one or more of the following: system information block (SIB) information, a radio resource control (RRC) message, or a physical layer signaling. The physical layer signaling includes at least one of the DCI or a control format indictor (CFI).

Alternatively, the first downlink control channel is a physical downlink control channel (PDCCH), and the second downlink control channel is a short physical downlink control channel (SPDCCH). The short TTI is a TTI a time domain length of which is smaller than 1 ms. The SPDCCH refers to a physical downlink control channel which occupies a part or all of resource elements within the short TTI and has a time domain length being smaller than or equal to the time domain length of the occupied short TTI.

Alternatively, after the terminal receives the DCI by using the determined downlink control channel, the method further includes the following step. The terminal performs a corresponding traffic receiving way according to the detected DCI. The corresponding traffic receiving way includes at least one of the following steps: when detecting the DCI of the terminal in the PDCCH, the terminal receives a traffic at the first short TTI; or, when detecting the DCI of the terminal in the PDCCH, the terminal receives a traffic at the TTI with the time domain length of 1 ms.

Alternatively, the SPDCCH, within the short TTI where the SPDCCH is located, uses resource elements within the short TTI together with a short physical downlink shared channel (SPDSCH) according to any one of the following resource multiplexing ways: time division multiplexing, frequency division multiplexing, code division multiplexing, or time frequency division multiplexing. The SPDSCH refers to a physical downlink shared channel which occupies a part or all of the resource elements within the short TTI and has a time domain length being smaller than or equal to the time domain length of the occupied short TTI.

Alternatively, information carried by the SPDCCH includes any one or more of the following: uplink grant (UL grant), downlink grant (DL grant), uplink and downlink joint grant (UL and DL grant), single-terminal acknowledgement/ negative acknowledgement feedback information (ACK/ NACK), or multi-terminal acknowledgement/negative acknowledgement feedback information (ACK/NACK).

Alternatively, at least one of the PDCCH or the SPDCCH is in the same short TTI with scheduled downlink data information.

The determining to use the second downlink control channel in the short TTI which is out of a scheduling range of the first downlink control channel includes: when the time domain length of the short TTI is larger than or equal to the time domain length of the PDCCH, determining that the SPDCCH is used in one or more short TTIs behind the first short TTI containing the PDCCH; and when the time domain length of the short TTI is smaller than the time domain length of the PDCCH, determining that the SPDCCH is used in one or more short TTIs behind a PDCCH region.

Alternatively, the method further includes the following steps. The terminal receives a short physical hybrid automatic repeat indicator channel (SPHICH) in the short TTI using the SPDCCH and obtains feedback information for transmission correctness of a SPUSCH of the short TTI. The SPHICH refers to a physical hybrid automatic repeat indicator channel which occupies a part or all of resource elements in the short TTI and has a time domain length being smaller than or equal to the time domain length of the occupied short TTI; and the SPUSCH refers to a physical uplink shared channel which occupies a part or all of resource elements in the short TTI and has a time domain length being smaller than or equal to the time domain length of the occupied short TTI.

The SPHICH performs puncturing transmission in the resources occupied by the SPDCCH, or the SPHICH performs transmission by using a part of resources independent from the resources occupied by the SPDCCH.

Alternatively, the method further includes the following steps. The terminal receives the SPHICH in the odd short TTIs and obtains feedback information for transmission correctness of the SPUSCH of the odd short TTIs.

Alternatively, at least one of the PDCCH or the SPDCCH is located in the same or different short TTIs with the scheduled downlink data information.

The determining the downlink control channel used in the short TTI according to the pre-definition or system configuration information includes: determining that, in the subframe behind the TTI where the PDCCH is located, each short TTI does not use the SPDCCH, or a part of TTIs uses the SPDCCH, or all the short TTIs use the SPDCCH.

Alternatively, the method further includes: the terminal receiving the SPHICH in the short TTI which does not contain the PDCCH or the short TTI outside the PDCCH region; when there is the SPDCCH in the short TTI, puncturing transmitting the SPHICH in the resources occupied by the SPDCCH, or transmitting the SPHICH by using a part of resources independent from the resources occupied by the SPDCCH; when there is no SPDCCH in the short TTI, transmitting the SPHICH by using a part of resources independent from the resources occupied by the SPDSCH, or, carrying in the SPDSCH information of joint encoding feedback information for transmission correctness of the SPUSCH of the short TTI with downlink data of the same terminal and transmitting the information in the SPDSCH.

Alternatively, the determining the downlink control channel used in the short TTI according to the pre-definition or system configuration information includes: when the time domain length of the short TTI is 0.5 ms, determining that the SPDCCH is not received; and determining whether the SPDSCH occupies even short TTIs or odd short TTIs according to 1 bit predetermined in the DCI in the PDCCH; and when a subframe, the time domain length of which is 1 ms, includes x short TTIs, determining that data scheduled by the SPDCCH or PDCCH is located in one or more short TTIs in the subframe according to m bits predetermined in the DCI in the SPDCCH or PDCCH, where x is a positive integer, and m≤x.

Alternatively, the method further includes the following steps. When the time domain length of the short TTI is 0.5 ms, the terminal receives the SPHICH in the odd short TTIs, where the SPHICH only carries feedback information for transmission correctness of the SPUSCH of the odd short TTIs. When the subframe the time domain length of which is 1 ms includes x short TTIs, the terminal uses the SPHICH in all the short TTIs or the short TTIs except the first short TTI in the subframe the time domain length of which is 1 ms, where the SPHICH only carries feedback information for transmission correctness of the SPUSCH of all the short TTIs or the short TTIs except the first short TTI in the subframe the time domain length of which is 1 ms.

A downlink control apparatus is disposed on a base station and includes a first determining module and a transmission module.

The first determining module is configured to determine at least one downlink control channel in a first downlink control channel and a second downlink control channel, which includes: determining to use the second downlink control channel in a short transmission time interval (TTI) which is out of a scheduling range of the first downlink control channel; or determining the downlink control channel used in a short TTI according to pre-definition or system configuration information.

The transmission module, is configured to transmit downlink control information (DCI) by using the determined downlink control channel.

Alternatively, the first downlink control channel is a physical downlink control channel (PDCCH), and the second downlink control channel is a short physical downlink control channel (SPDCCH). The short TTI is a TTI a time domain length of which is smaller than 1 ms. The SPDCCH refers to a physical downlink control channel which occupies a part or all of resource elements within the short TTI and has a time domain length being smaller than or equal to the time domain length of the occupied short TTI.

A downlink control apparatus is disposed on a terminal and includes a second determining module and a reception module.

The second determining module is configured to determine at least one downlink control channel in a first downlink control channel and a second downlink control channel, which includes: determining to use the second downlink control channel in a short transmission time interval (TTI) which is out of a scheduling range of the first downlink control channel; or determining the downlink control channel used in a short TTI according to pre-definition or system configuration information.

The reception module is configured to receive downlink control information (DCI) by using the determined downlink control channel.

Alternatively, the first downlink control channel is a physical downlink control channel (PDCCH), and the second downlink control channel is a short physical downlink control channel (SPDCCH). The short TTI is a TTI a time domain length of which is smaller than 1 ms. The SPDCCH refers to a physical downlink control channel which occupies a part or all of resource elements within the short TTI and has a time domain length being smaller than or equal to the time domain length of the occupied short TTI.

A computer-readable storage medium storing a computer-executable instruction, and the computer-executable instruction is executed to perform the above method.

The downlink control solution provided by the embodiments of the present disclosure may solve the problem of using the downlink control channel in the short TTI including fewer OFDM symbols, the shorter RTT (Round-Trip Time) may be correspondingly obtained in a case where a short TTI with a new granularity is used, and the low-delay communication demand may be met.

Other aspects will become apparent upon reading and understanding accompanying drawings and detailed description.

DETAILED DESCRIPTION

It is to be illustrated that embodiments and features in the embodiments of the present disclosure may be combined with each other if there are no conflicts. In addition, although a logic order is shown in the flow diagrams, in some cases, the illustrated or described steps may be performed in an order different from the order described herein.

Figure 1:
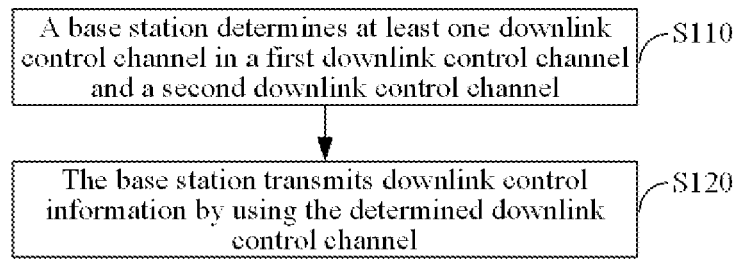
FIG. 1 is a flow chart of a downlink control method according to a first embodiment.

A first embodiment, a downlink control method may be applied to a base station side, and as shown in FIG. 1, includes steps S110 to S120.

In S110, a base station determines at least one downlink control channel in a first downlink control channel and a second downlink control channel. The step includes that: it is determined that the second downlink control channel is used in a short TTI which may not be scheduled and indicated by the first downlink control channel, that is, it is determined that the second downlink control channel is used in the short TTI which is out of a scheduling range of the first downlink control channel; or the downlink control channel used in the short TTI may be further determined according to pre-definition or system configuration information, for instance, which may be determined by, but not limited to, the following ways: an MIB (Management Information Base), an SIB (System Information Block), an RRC (Radio Resource Control), and the like.

In S120, the base station transmits downlink control information (DCI) by using the determined downlink control channel.

The first downlink control channel may be, but not limited to, a PDCCH. The second downlink control channel may be, but not limited to, a SPDCCH (Short PDCCH, Short Physical Downlink Control Channel). The short TTI may be a TTI the time domain length of which is smaller than 1 ms (millisecond). The SPDCCH may refer to a physical downlink control channel which occupies all or a part of resource elements within a short TTI and has the time domain length being smaller than or equal to the time domain length of the occupied short TTI.

Alternatively, the pre-definition or system configuration information indicates a case where all short TTIs use the second downlink control channel. The case where all the short TTIs use the second downlink control channel includes at least one of the following: all the short TTIs use the second downlink control channel, a part of the short TTIs uses the second downlink control channel, or all the short TTIs do not use the second downlink control channel.

Alternatively, the case where a part of the short TTIs uses the second downlink control channel includes at least one of the following cases: except that the first short TTI or former P short TTIs do not use the second downlink control channel, the remaining short TTIs use the second downlink control channel; except that the first short TTI or former Q short TTIs do not use the second downlink control channel, a part of the remaining short TTIs uses the second downlink control channel; or, the first short TTI uses the second downlink control channel, and a part of the subsequent short TTIs uses the second downlink control channel.

Each of P and Q is an integer which is larger than 1 and smaller than R, and R is the number of the short TTIs included by the TTI with the time domain length of 1 ms.

Alternatively, the SPDCCH, within the short TTI where the SPDCCH is located, uses resource elements within a short TTI with a SPDSCH (Short PDSCH, Short Physical Downlink Shared Channel) according to any one of the following resource multiplexing ways: time division multiplexing, frequency division multiplexing, code division multiplexing, or time frequency division multiplexing.

The SPDSCH may refer to a physical downlink shared channel which occupies a part or all of the resource elements within a short TTI and has the time domain length being smaller than or equal to the time domain length of the occupied short TTI.

Figure 2:
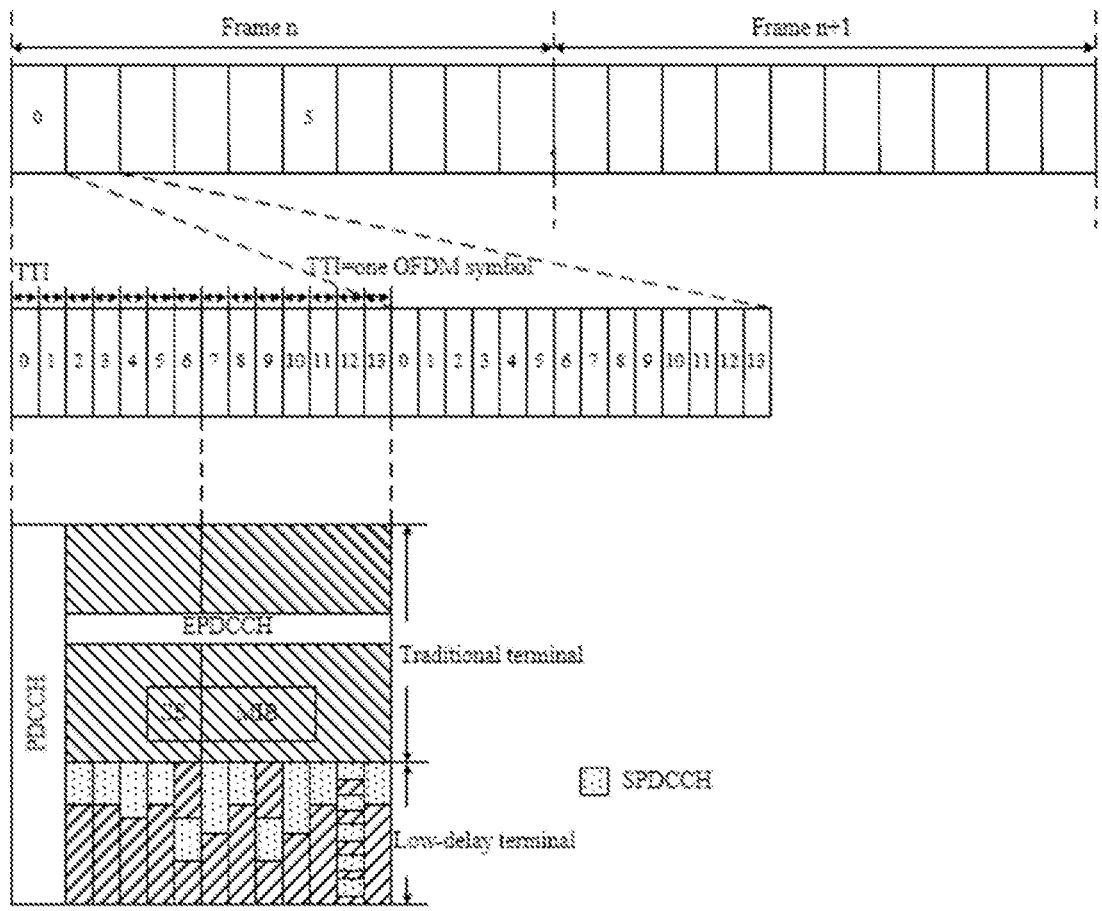
FIG. 2 is a schematic diagram of resource multiplexing of a SPDCCH and a SPDSCH when a short TTI is in a length of a single OFDM symbol according to a first embodiment.

In one of alternative solutions, when the short TTI has a length of a single OFDM symbol (that is, the time domain length of the short TTI is equal to the time domain length of the single OFDM symbol), the SPDCCH and the SPDSCH may perform resource occupancy within the short TTI in a frequency division or code division multiplexing way. As shown in FIG. 2, the frequency division way includes: using a single OFDM symbol resource in an interlacing way by taking a single RE (Resource Element) or X REs as a unit, where X is a positive integer larger than 1; or using all or a part of even REs or even RE groups for the SPDCCH, where one RE group includes X REs, and using the remaining REs or RE groups for the SPDSCH; or using all or a part of odd REs or odd RE groups for the SPDCCH, where one RE group includes X REs, and using the remaining REs or RE groups for the SPDSCH.

In one of alternative solutions, in an SPDCCH region within the short TTI, the SPDCCH performs resource occupancy by taking an SCCE (Short Control Channel Element) as a granularity. Alternatively, the SPDCCH occupies 1, 2, 4 or 8 SCCEs, and the distribution way of the SCCEs within the SPDCCH region may include any one of the following: a time frequency division occupancy as shown in FIG. 3($a$), an interlaced occupancy as shown in FIG. 3($b$), a frequency division occupancy as shown in FIG. 3($c$), a time division occupancy, a code division occupancy, and the like.

The SCCE is a control channel element the time domain length of which is smaller than or equal to the time domain length of the short TTI.

Information carried by the SPDCCH includes any one or several of the following: UL (Uplink) grant, DL (Downlink) grant, UL and DL grant (Uplink and Downlink Joint Grant), single-terminal acknowledgement/negative acknowledgement feedback information (ACK/NACK), or multi-terminal acknowledgement/negative acknowledgement feedback information (ACK/NACK).

Alternatively, in a subframe, resources except for the PDCCH region are used by terminals with different delay demands according to a frequency division multiplexing way. FIG. 2 and FIG. 5 to FIG. 9 are schematic diagrams of frequency division multiplexing ways. Or, resources in different subframes or radio frames are used by terminals with different delay demands according to a time division multiplexing way.

The terminals with different delay demands may be, but not limited to, a traditional terminal and a low-delay terminal.

Except for regions of PDCCH, a PSS (Primary Synchronization Signal)/SSS (Secondary Synchronization Signal) and a PBCH (Physical Broadcast Channel), the remaining resources may be used by the terminals with different delay demands according to the frequency division multiplexing way.

Alternatively, the time domain length of the short TTI is predefined or notified by a signaling. The signaling in signaling notification includes SIB information or a RRC message or a physical layer signaling. The physical layer signaling includes a DCI (Downlink Control Information) or a CFI (Control Format Indictor).

Alternatively, the DCI is used for notifying a terminal of a corresponding traffic receiving way. The traffic receiving way includes at least one of: when the DCI of the terminal is located in the PDCCH, receiving a traffic at the first short TTI, or receiving a traffic at the TTI with the time domain length of 1 ms.

The solution of this embodiment is described in two cases.

For the first case, at least one of the PDCCH or the SPDCCH may only be located in the same short TTI with the scheduled downlink data information. At this time, there is no time domain scheduling information in the DCI, at least one of the PDCCH or the SPDCCH does not support scheduling across the short TTIs, and a DCI scheduling traffic message in the related art is used.

The first case includes two scenarios.

The first scenario, only the PDCCH or the SPDCCH is used. Under the scenario, the used downlink control channel (the PDCCH or the SPDCCH) is located in the same short TTI with the scheduled downlink data information.

The second scenario, both the PDCCH and the SPDCCH are used. There are three possibilities under the scenario: only the PDCCH is located in the same short TTI with the scheduled downlink data information, only the SPDCCH is located in the same short TTI with the scheduled downlink data information, and both the PDCCH and the SPDCCH are located in the same short TTI with the scheduled downlink data information.

Alternatively, in the first case, the step of determining that the second downlink control channel is used in the short TTI which is out of the scheduling range of the first downlink control channel includes that: when the time domain length of the short TTI is larger than or equal to the time domain length of the PDCCH, it is determined that the SPDCCH is used in one or more short TTIs behind the first short TTI including the PDCCH; when the time domain length of the short TTI is smaller than the time domain length of the PDCCH, it is determined that the SPDCCH is used in one or more short TTIs behind the PDCCH region.

The SPDCCH may further include feedback information for transmission correctness of a SPUSCH (Short Physical Uplink Shared Channel) of the short TTI. The SPUSCH refers to a physical uplink shared channel which occupies a part or all of resource elements in the short TTI and has the time domain length being smaller than or equal to the time domain length of the occupied short TTI.

The method may further include the following steps.

The base station transmits the feedback information for transmission correctness of the SPUSCH of the short TTI by using a SPHICH (Short Physical Hybrid ARQ Indicator Channel) in the short TTI using the SPDCCH. The SPHICH performs puncturing transmission in the resources occupied by the SPDCCH, or the SPHICH performs transmission by using a part of resources independent from the resources occupied by the SPDCCH. The SPHICH refers to a physical hybrid automatic repeat indicator channel which occupies a part or all of resource elements in the short TTI and has the time domain length being smaller than or equal to the time domain length of the occupied short TTI.

At this time, the SPDCCH is only used for control and scheduling of the short TTI.

The size of an RBG (Resource Block Group), serving as a granularity of RA (Resource Allocation) used by scheduling the short TTI, may be larger than or equal to the size of an RBG used by scheduling the TTI with the time domain length of 1 ms under the same system bandwidth (in which, the RBG used by scheduling the TTI with the time domain length of 1 ms is the RBG used by the traditional terminal).

A way of determining a transport block size (TBS) configuration table used by scheduling the short TTI may include that: a TBS in a predetermined TBS configuration table is used to be multiplied by a proportion Y according to the proportion Y of the time domain length of the short TTI to 1 ms, where 0%<Y<100%; and the product is rounded up or down to obtain the TBS in the TBS configuration table used by scheduling the short TTI.

When the time domain length of the short TTI is 0.5 ms, the PDCCH may schedule an even short TTIs in DL, and the SPDCCH may schedule an odd short TTIs in DL; and the PDCCH and the SPDCCH schedule UL traffics of a subframe n+k, where k may be, but is not limited to, 2, 4 or 8, and n is a serial number of the current subframe (that is, the subframe where the PDCCH and the SPDCCH are located).

Correspondingly, the method may further include the following step.

The base station may transmit feedback information for transmission correctness of the SPUSCH of the odd short TTIs by using the SPHICH in the odd short TTIs, herein the SPHICH only carries the feedback information for transmission correctness of the SPUSCH of the odd short TTIs.

For a second case, at least one of the PDCCH or the SPDCCH is not limited to be located in the same short TTI with the scheduled downlink data information, that is, at least one of the PDCCH or the SPDCCH may be located in the same short TTI or in different short TTIs. At this time, there is time domain scheduling information in the DCI, and at least one of the PDCCH or the SPDCCH supports scheduling across the short TTIs.

Alternatively, in the second case, the step of determining the downlink control channel used in the short TTI according to the pre-definition or system configuration information includes that: it is determined that in the subframe, behind the TTI where the PDCCH is located, each short TTI does not use the SPDCCH or a part of short TTIs uses the SPDCCH or all the short TTIs use the SPDCCH.

The method may further include that: the base station uses the SPHICH in the short TTI which does not include the PDCCH or in the short TTI outside the PDCCH region. When there is the SPDCCH in the short TTI, the SPHICH performs puncturing transmission in the resources occupied by the SPDCCH, or the SPHICH performs transmission by using a part of resources independent from the resources occupied by the SPDCCH. When there is no SPDCCH in the short TTI, the SPHICH performs transmission by using a part of resources independent from the resources occupied by the SPDSCH, or the SPDSCH carries information of joint encoding feedback information for transmission correctness of the SPUSCH of the short TTI with downlink data of the same terminal, and the information is transmitted in the SPDSCH.

The step of determining the downlink control channel used in the short TTI according to the pre-definition or system configuration information may include that: when the time domain length of the short TTI is 0.5 ms, it is determined that the SPDCCH is not used, and it is determined whether the SPDSCH occupies the even short TTIs or odd short TTIs according to 1 bit predetermined in the DCI in the PDCCH; and when the subframe, the time domain length of which is 1 ms, includes x short TTIs, it is indicated that data scheduled by the SPDCCH or PDCCH is located in one or more short TTIs in the subframe by m bits predetermined in the DCI in the SPDCCH or PDCCH, where x is a positive integer, and m≤x.

Correspondingly, the method may further include that: when the time domain length of the short TTI is 0.5 ms, the base station uses the SPHICH in the odd short TTIs, and the SPHICH only carries feedback information for transmission correctness of the SPUSCH of the odd short TTIs; and when the subframe, the time domain length of which is 1 ms, includes x short TTIs, the SPHICH is used in all the short TTIs or the short TTIs except the first short TTI in the subframe the time domain length of which is 1 ms, and the SPHICH only carries feedback information for transmission correctness of the SPUSCH of all the short TTIs or the short TTIs except the first short TTI in the subframe the time domain length of which is 1 ms.

Alternatively, the time domain length of the short TTI is pre-definition or notified by a signaling. The signaling may include any one or several of the following: SIB information, a RRC message and a physical layer signaling. The physical layer signaling includes the DCI or a CFI.

Figures 3A, 3B, 3C, 4:
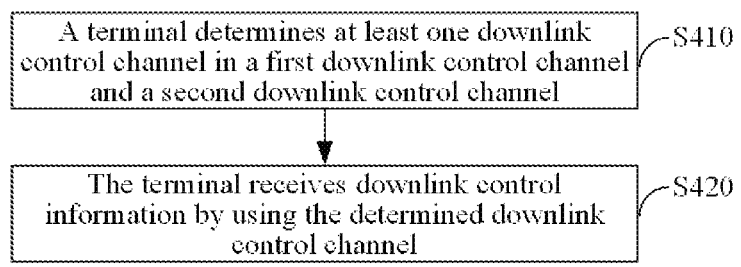
FIG. 3(a) to FIG. 3(c) are schematic diagrams of distribution ways of SCCEs within a region of a SPDCCH according to a first embodiment.
FIG. 4 is a flow chart of a downlink control method according to a second embodiment.

A second embodiment, a downlink control method may be applied to a terminal side, a terminal may be, but not limited to, a low-delay terminal. As shown in FIG. 4, the downlink control method includes steps S410 to S420.

In S410, the terminal determines at least one downlink control channel in a first downlink control channel and a second downlink control channel. The step includes that: it is determined that the second downlink control channel is used in a short TTI which may not be scheduled and indicated by the first downlink control channel, that is, the second downlink control channel is used in the short TTI which is out of a scheduling range of the first downlink control channel; or the downlink control channel used in the short TTI may be further determined according to pre-definition or system configuration information, for instance, which may be determined by an MIB, an SIB, or an RRC, and the like.

In S420, the terminal receives downlink control information (DCI) by using the determined downlink control channel.

This embodiment may be, but not limited to, used in downlink control of the low-delay terminal.

Alternatively, the pre-definition or system configuration information indicates a case where all short TTIs use the second downlink control channel. The case where all the short TTIs use the second downlink control channel includes at least one of the following: all the short TTIs use the second downlink control channel, a part of the short TTIs uses the second downlink control channel, or all the short TTIs do not use the second downlink control channel.

The case where a part of the short TTIs uses the second downlink control channel may include that: except that the first short TTI or former P short TTIs do not use the second downlink control channel, the remaining short TTIs use the second downlink control channel; except that the first short TTI or former Q short TTIs do not use the second downlink control channel, a part of the remaining short TTIs uses the second downlink control channel; the first short TTI uses the second downlink control channel, and a part of the subsequent short TTIs uses the second downlink control channel Each of P and Q is an integer which is larger than 1 and smaller than R, and R is the number of the short TTIs included by the TTI with a time domain length of 1 ms.

Alternatively, the time domain length of the short TTI is predefined or notified by a signaling. The signaling includes any one or more of the following: system information block (SIB) information, a radio resource control (RRC) message, or a physical layer signaling. The physical layer signaling includes at least one of the DCI or a control format indictor (CFI).

Alternatively, the first downlink control channel is a physical downlink control channel (PDCCH), and the second downlink control channel is a short physical downlink control channel (SPDCCH). The short TTI is a TTI a time domain length of which is smaller than 1 ms. The SPDCCH refers to a physical downlink control channel which occupies a part or all of resource elements within the short TTI and has a time domain length being smaller than or equal to the time domain length of the occupied short TTI.

Alternatively, after the terminal receives the DCI by using the determined downlink control channel, the method further includes the following step. The terminal performs a corresponding traffic receiving way according to the detected DCI. The corresponding traffic receiving way includes at least one of the following: when detecting the DCI of the terminal in the PDCCH, the terminal receives a traffic at the first short TTI; or, when detecting the DCI of the terminal in the PDCCH, the terminal receives a traffic at the TTI with the time domain length of 1 ms.

That is, for the low-delay terminal, a part of 1-ms subframes performs an operation that the PDCCH schedules the first short TTI, and the other part of the 1-ms subframes performs an operation that the PDCCH schedules the 1-ms TTI to receive traffics.

Alternatively, the SPDCCH, within the short TTI where the SPDCCH is located, uses resource elements within the short TTI with a short physical downlink shared channel (SPDSCH) according to any one of the following resource multiplexing ways: time division multiplexing, frequency division multiplexing, code division multiplexing, or time frequency division multiplexing. The SPDSCH refers to a physical downlink shared channel which occupies a part or all of the resource elements within the short TTI and has a time domain length being smaller than or equal to the time domain length of the occupied short TTI.

Alternatively, information carried by the SPDCCH includes any one or more of the following: uplink grant (UL grant), downlink grant (DL grant), uplink and downlink joint grant (UL and DL grant), single-terminal acknowledgement/negative acknowledgement feedback information (ACK/NACK), or multi-terminal acknowledgement/negative acknowledgement feedback information (ACK/NACK).

Alternatively, at least one of the PDCCH or the SPDCCH is in the same short TTI with scheduled downlink data information.

The determining to use the second downlink control channel in the short TTI which is out of a scheduling range of the first downlink control channel includes: when the time domain length of the short TTI is larger than or equal to the time domain length of the PDCCH, determining that the SPDCCH is used in one or more short TTIs behind the first short TTI including the PDCCH; and when the time domain length of the short TTI is smaller than the time domain length of the PDCCH, determining that the SPDCCH is used in one or more short TTIs behind a PDCCH region.

The method may further include the following steps. The terminal receives a short physical hybrid automatic repeat indicator channel (SPHICH) in the short TTI using the SPDCCH and obtains feedback information for transmission correctness of a SPUSCH of the short TTI. The SPHICH refers to a physical hybrid automatic repeat indicator channel which occupies a part or all of resource elements in the short TTI and has a time domain length being smaller than or equal to the time domain length of the occupied short TTI.

The SPUSCH refers to a physical uplink shared channel which occupies a part or all of resource elements in the short TTI and has a time domain length being smaller than or equal to the time domain length of the occupied short TTI.

The SPHICH performs puncturing transmission in the resources occupied by the SPDCCH, or the SPHICH performs transmission by using a part of resources independent from the resources occupied by the SPDCCH.

The method may further include the following steps. The terminal receives the SPHICH in the odd short TTIs and obtains feedback information for transmission correctness of the SPUSCH of the odd short TTIs.

Alternatively, at least one of the PDCCH or the SPDCCH is located in the same or different short TTIs with the scheduled downlink data information.

The determining the downlink control channel used in the short TTI is determined according to the pre-definition or system configuration information includes that: it is determined that, in the subframe behind the TTI where the PDCCH is located, each short TTI does not use the SPDCCH, or a part of TTIs uses the SPDCCH, or all the short TTIs use the SPDCCH.

The method may further include the following steps. The terminal receives the SPHICH in the short TTI which does not include the PDCCH or in the short TTI outside the PDCCH region. When there is the SPDCCH in the short TTI, the SPHICH performs puncturing transmission in the resources occupied by the SPDCCH, or the SPHICH performs transmission by using a part of resources independent from the resources occupied by the SPDCCH. When there is no SPDCCH in the short TTI, the SPHICH performs transmission by using a part of resources independent from the resources occupied by the SPDSCH, or the SPDSCH carries information of joint encoding feedback information for transmission correctness of the SPUSCH of the short TTI with downlink data of the same terminal, and the information is transmitted in the SPDSCH.

The determining the downlink control channel used in the short TTI according to the pre-definition or system configuration information may include the following cases.

When the time domain length of the short TTI is 0.5 ms, it is determined that the SPDCCH is not received; and it is determined whether the SPDSCH occupies even short TTIs or odd short TTIs according to 1 bit predetermined in the DCI in the PDCCH.

When the subframe, the time domain length of which is 1 ms, includes x short TTIs, it is determined that data scheduled by the SPDCCH or PDCCH is located in one or more short TTIs in the subframe according to m bits used in the DCI in the SPDCCH or PDCCH, where x is a positive integer, and m≤x.

Correspondingly, the method may further include the following cases.

When the time domain length of the short TTI is 0.5 ms, the terminal receives the SPHICH in the odd short TTIs, and the SPHICH only carries feedback information for transmission correctness of the SPUSCH of the odd short TTIs.

When the subframe, the time domain length of which is 1 ms, includes x short TTIs, the terminal uses the SPHICH in all the short TTIs or the short TTIs except the first short TTI in the subframe the time domain length of which is 1 ms, and the SPHICH only carries feedback information for transmission correctness of the SPUSCH of all the short TTIs or the short TTIs except the first short TTI in the subframe the time domain length of which is 1 ms.

The first embodiment and the second embodiment will be illustrated below by using five exemplary embodiments.

Exemplary Embodiment One

Figure 5:
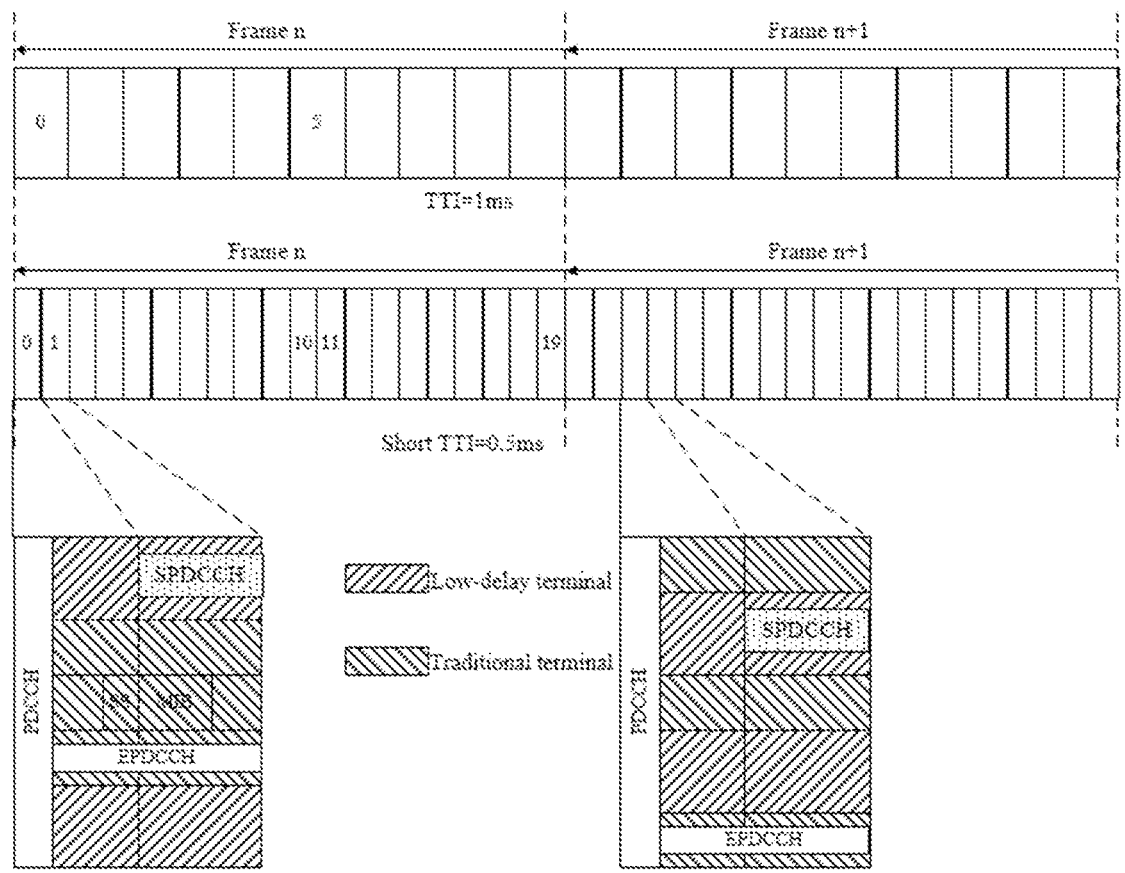
FIG. 5 is a schematic diagram of resource use according to an exemplary embodiment one.

As shown in FIG. 5, when the short TTI=0.5 ms, for the low-delay terminal, it is equivalent to taking a time slot in a frame structure of a LTE system as a basic length time domain unit of the short TTI. Except for a PDCCH region, a PSS/SSS region and a PBCH region, the remaining resources are subjected to frequency division multiplexing.

The PDCCH may be used to schedule the traditional terminal and the low-delay terminal, and the PDCCH does not support scheduling across subframes/TTIs. For blindly detecting the PDCCH region, through different C-RNTIs (Cell Radio Network Temporary Identifiers), when the traditional terminal detects the DCI of the terminal itself, the corresponding PDSCH occupies subframes/TTIs with 1 ms., when the low-delay terminal detects the DCI of the terminal itself, the corresponding SPDSCH occupies short TTIs with 0.5 ms, i.e., the even short TTIs. Frequency domain resource regions used respectively are distinguished by a RA domain in the DCI. For the traditional terminal, the EPDCCH may be used in a region of the traditional terminal, may only schedule the traditional terminal and schedule the subframes with 1 ms.

For the low-delay terminal, the odd short TTIs (that is, the odd time slots of the LTE system) use the SPDCCH. The base station schedules the even short TTIs in DL by using the PDCCH and schedules the odd short TTIs in DL by using the SPDCCH. The SPDCCH is only used for control scheduling of the odd subframes with 0.5 ms and carries feedback information of the SPUSCH. The PDCCH and the SPDCCH schedule UL traffics of n+k, where k may be, but not limited to, 2, 4 or 8.

Alternatively, a DCI format in the SPDCCH is the same as a DCI format of the PDCCH scheduling the low-delay terminal.

Alternatively, the size of a RBG serving as a granularity of RA (Resource Allocation) used by scheduling the short TTI is not smaller than the size a RBG used by the traditional terminal under the same system bandwidth.

Alternatively, in the related art, resource allocation in the region of the traditional terminal takes PRB allocation into account according to a transport block size (TBS) configuration table in the related art, and resource allocation in the region of the low-delay terminal may take PRB allocation into account according to a new TBS configuration table. A way of determining the new TBS configuration table includes: according to a proportion Y of the time domain length of the short TTI to 1 ms, a TBS in a predetermined TBS configuration table is multiplied by Y (0%<Y<100%), and the resulting product is rounded up or down to obtain the TBS in the new TBS configuration table. The predetermined TBS configuration table may be a TBS configuration table in the related art. For example, a partial excerpt of the TBS configuration table in the related art is shown as a table 1, the short TTI=0.5 ms, then Y-50%, thus a part of the new TBS configuration table, corresponding to the partial excerpt in the TBS configuration table (table 1) in the related art is shown as a table 2.

TABLE 1

TBS Configuration Table in Related Art

| $I_{TBS}$ | $N_{PRB}$ | | | |
|---|---|---|---|---|
| | 1 | ... | 6 | ... |
| 0 | 16 | ... | 152 | ... |
| 1 | 24 | ... | 208 | ... |
| ... | ... | ... | ... | ... |
| 26 | 712 | ... | 7392 | ... |

TABLE 2

New TBS Configuration Table

| $I_{TBS}$ | $N_{PRB}$ | | | |
|---|---|---|---|---|
| | 1 | ... | 6 | ... |
| 0 | 8 | ... | 76 | ... |
| 1 | 12 | ... | 104 | ... |
| ... | ... | ... | ... | ... |
| 26 | 356 | ... | 3696 | ... |

By means of a solution of the exemplary embodiment, for a case where the short TTI=0.5 ms, the SPDCCH is used in the odd short TTIs, so that the downlink control channel may be used in each of the short TTIs. Meanwhile, one RTT delay may be reduced by 0.5 ms to 4 ms in comparison with that of the LTE system, which depends on whether the corresponding processing delay is the same as that of LTE or is reduced by half with equal proportion.

Exemplary Embodiment Two

Figure 6:
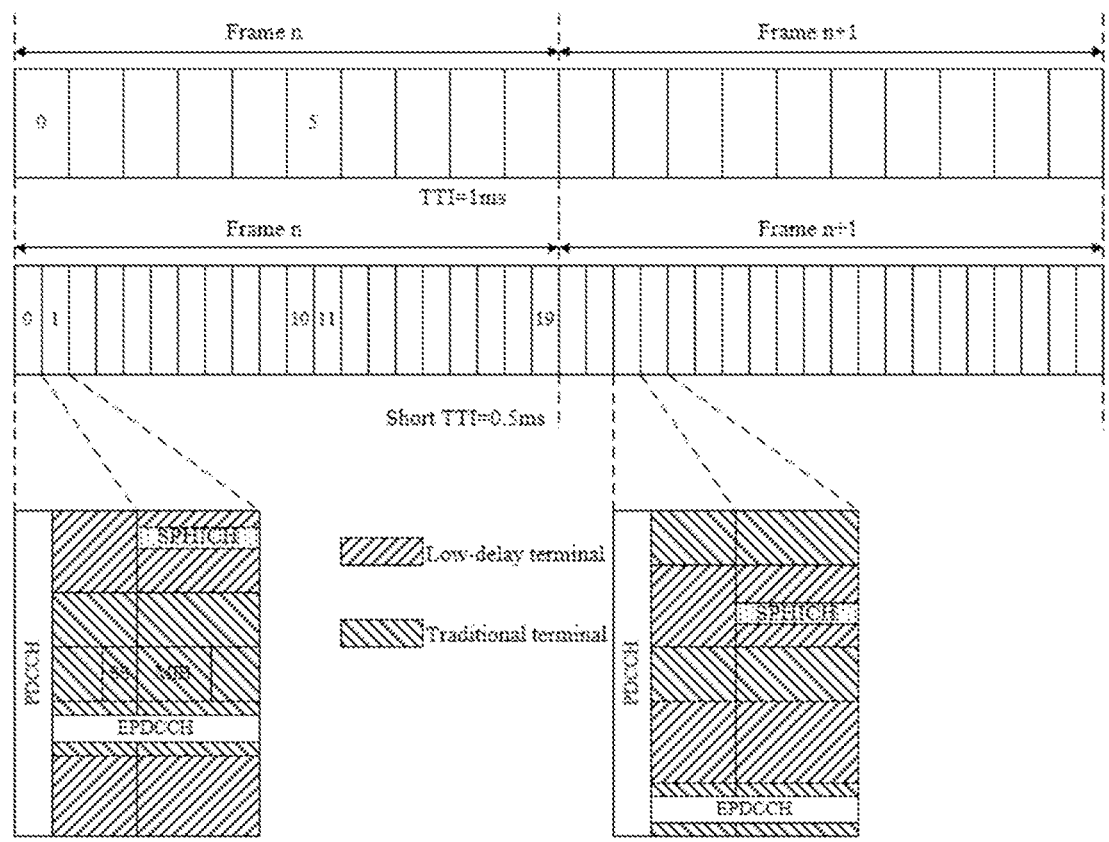
FIG. 6 is a schematic diagram of resource use according to an exemplary embodiment two.

As shown in FIG. 6, when a short TTI=0.5 ms, for a low-delay terminal, it is equivalent to taking a time slot in a frame structure of a LTE system as a basic length time domain unit of the short TTI. Except for a PDCCH region, a PSS/SSS region and a PBCH region, the remaining resources are subjected to frequency division multiplexing.

A PDCCH may be used to schedule a traditional terminal and a low-delay terminal, and the PDCCH supports cross-subframe/TTI scheduling. The terminal blindly detects a region of the PDCCH. Through different C-RNTIs, when the traditional terminal detects the DCI of the terminal itself, the corresponding PDSCH occupies subframes/TTIs with 1 ms, when the low-delay terminal detects the DCI of the terminal itself, the corresponding SPDSCH occupies subframes/TTIs with 0.5 ms. At this time, a 1 bit identification bit domain is added in the DCI, and the 1 bit identification bit domain distinguishes that the TTI/subframe is an even number (k TTIs/subframes) or an odd number (k+1 TTIs/subframes). According to an identification indication of the DCI, it is determined whether the short TTI with 0.5 ms occupied by the corresponding SPDSCH is the even number or the odd number. Frequency domain resource regions used respectively are distinguished by the RA domain in the DCI. For the traditional terminal, an EPDCCH may be used in a region of the traditional terminal, may only schedule the traditional terminal and schedule the subframes with 1 ms.

For the low-delay terminal, the odd short TTIs (that is, the odd time slots of the LTE system) use a SPHICH. The SPHICH only carries feedback information for transmission correctness of a SPUSCH of the odd short TTIs. At this time, a PHICH performs feedback on the subframes with 1 ms of the traditional terminal and performs feedback on the PUSCH on the even TTIs/subframes with 0.5 ms of the low-delay terminal, and the SPHICH only performs feedback on the PUSCH on the odd TTIs/subframes with 0.5 ms of the low-delay terminal. The SPHICH is transmitted by using a part of resources independent of the resources occupied by the SPDSCH.

The PDCCH schedules UL traffics of n+k, and a 1 bit identification bit domain that distinguishes the even TTIs/subframes (including the current TTI/subframe and k TTI/subframe) and the odd TTIs/subframes (k+1 TTI/subframe) is added in UL grant, where k may be, but is not limited to, 2, 4 or 8.

Alternatively, a DCI format in the SPDCCH is the same as a DCI format of the PDCCH scheduling the low-delay terminal.

Alternatively, resource allocation of the region of the terminal in the related art takes PRB allocation into account according to a transport block size (TBS) configuration table in the related art, and resource allocation of the region of the low-delay terminal may take PRB allocation into account according to a new TBS configuration table.

By means of a solution of the exemplary embodiment, for a case where the short TTI=0.5 ms, the even TTIs is scheduled by the PDCCH in the current subframe and the odd TTIs is scheduled by the PDCCH across the subframes, which makes it unnecessary to use the SPDCCH, and the SPHICH is used only for the odd TTIs, so that the total amount of the resources occupied by the control information is reduced and the resource utilization rate is increased. Compared with the exemplary embodiment one in which the one RTT delay may be reduced by 0.5 ms to 4 ms in comparison with the LTE system, the corresponding RTT delay in the exemplary embodiment two may be the same or add 0.5 ms more in comparison with the exemplary embodiment one.

Exemplary Embodiment Three

Figure 7:
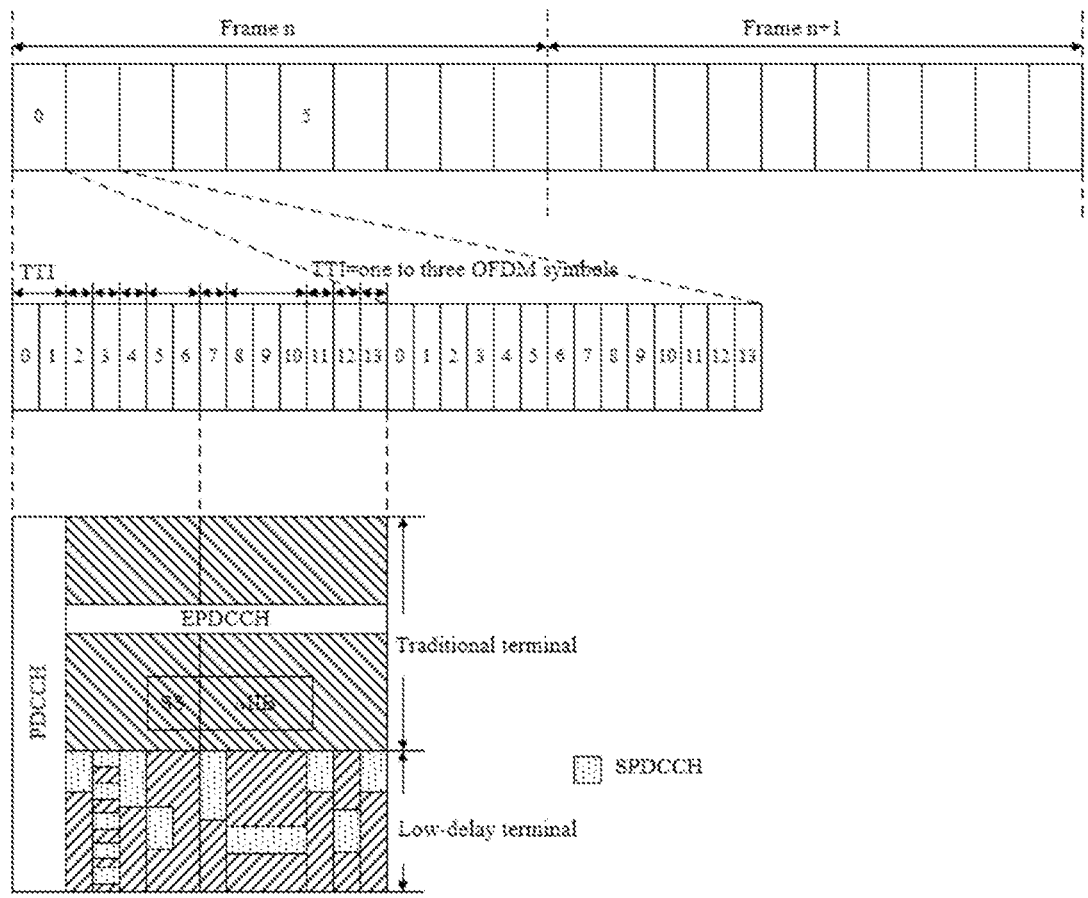
FIG. 7 is a schematic diagram of resource use according to an exemplary embodiment three.

As shown in FIG. 7, the short TTIs with variable lengths are supported in one subframe with 1 ms, and a region of a PDCCH acts as one short TTI in the subframe with 1 ms, that is, the first short TTI in the subframe with 1 ms is formed by a region of a legacy PDCCH, and the subsequent legacy PDSCH region is used by a traditional terminal and a low-delay terminal in a frequency-division way, here the resource region used by the low-delay terminal is length-variable. A DCI is newly added by the legacy PDCCH to notify a short TTI pattern with variable lengths. For example, a bitmap pattern is used, in which it indicates a boundary of the short TTI when 0 and 1 change; for example, "00101001000101" is used to indicate the time domain length of each short TTI with the variable length in FIG. 7.

In the resource region of the low-delay terminal, within a plurality of short TTIs with different time domain lengths, a SPDCCH and a SPDSCH use resources in a time division multiplexing way, a frequency division multiplexing way, a code division multiplexing way, or a time frequency division multiplexing way. For example, when the short TTI includes two or three OFDM symbols (that is, the time domain length of the short TTI is equal to the sum of the time domain lengths of the two or three OFDM symbols), the SPDCCH and the SPDSCH use different OFDM symbols in the time division multiplexing way; or the SPDCCH use resources together with the SPSCH in the frequency division multiplexing way within the current short TTI only, and resources of the remaining OFDM symbols are used by the SPDSCH.

When the short TTI has a length of a single OFDM symbol, the SPDCCH and the SPDSCH use resources in the frequency division or code division multiplexing way within the short TTI. The frequency division way includes: interlacing to use resources of a single OFDM symbol by taking a single RE or X REs as a unit; or the SPDCCH uses all or a part of even REs or even RE groups, where one RE group includes X REs, and the SPDSCH uses the remaining REs; or the SPDCCH uses all or a part of odd REs or odd RE groups, where one RE group includes X REs, and the SPDSCH uses the remaining REs.

Alternatively, the short TTIs with variable lengths are applied to an uplink subframe simultaneously, that is, a division of the time domain length of each short TTI in the uplink subframe with 1 ms is consistent with the division the time domain length of each short TTI in the downlink subframe with 1 ms.

Alternatively, for carrying feedback information for transmission correctness of a SPUSCH in the SPDCCH or in the SPHICH, the SPHICH may, but is not limited to, perform puncturing transmission in the resources occupied by the SPDCCH or transmission by using a part of the resources independent of the resources occupied by the SPDCCH.

The method for implementing the short TTIs with variable lengths according to the exemplary embodiment may flexibly divide multiple short TTIs of different time domain lengths in the subframe in the related art and ensure that different traffic types or traffic QoS (Quality of Service) of data packets select appropriate short TTIs for transmission, especially, suitable for smaller traffic burst transmission of the data packets.

Exemplary Embodiment Four

Figure 8:
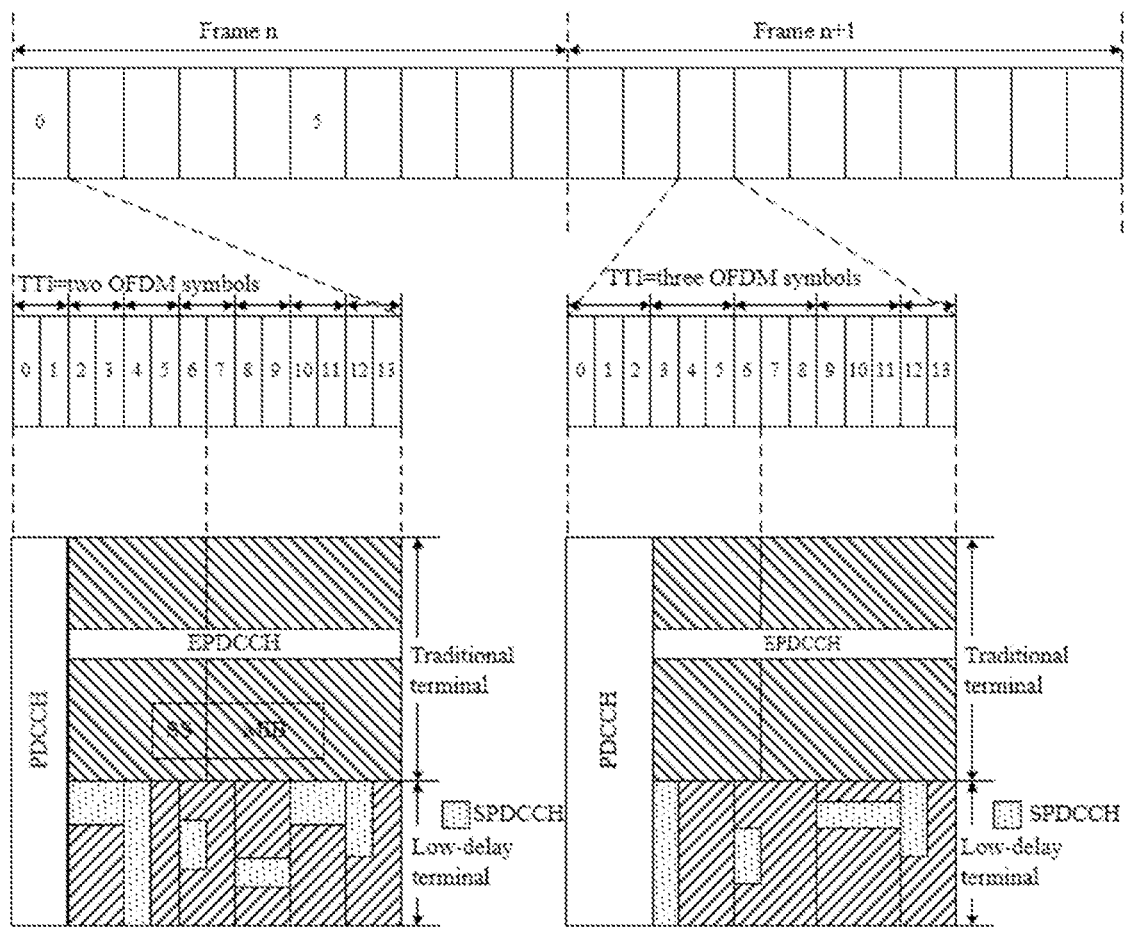
FIG. 8 is a schematic diagram of resource use according to an exemplary embodiment four.

As shown in FIG. 8, short TTIs with variable lengths are supported across subframes with 1 ms, and time domain lengths of the short TTIs are determined by using CFI. The CFI is always transmitted on the first OFDM and may be obtained firstly. A PDCCH region serves as a short TTI in a subframe with 1 ms, that is, the first short TTI in the subframe with 1 ms is formed by a region of a legacy PDCCH, and the subsequent legacy PDSCH region is used by a traditional terminal and a low-delay terminal in a frequency division way, in which the resource region, used by the low-delay terminal, is variable in the time domain length between different subframes with 1 ms. The time domain lengths of all the short TTIs are the same or approximately the same within one subframe with 1 ms. That is, when the CFI does not change, the short TTI is length-fixed, and when the CFI changes, the short TTI is length-variable.

For CFI=1, all the short TTIs, within the subframe with 1 ms where the CFI is located, perform TTI=1 OFDM symbol. For CFI=2, all the short TTIs, within the subframe with 1 ms where the CFI is located, perform TTI=2 OFDM symbols. For CFI=3, when a normal CP is used, the subframe with 1 ms is formed by four short TTIs each of which has a length of 3 OFDM symbols (that is, one short TTI has a length of three OFDM symbols) and one short TTI having a length of 2 OFDM symbols (that is, the short TTI has a length of two OFDM symbols); and when a long CP is used, the subframe with 1 ms is formed by four short TTIs each of which has a length of 3 OFDM symbols.

In the resource region of the low-delay terminal, within a plurality of short TTIs of different time domain lengths, a SPDCCH and a SPDSCH use resources in a time division multiplexing way, a frequency division multiplexing way, a code division multiplexing way, or a time frequency division multiplexing way. For example, when the short TTI has a length of two or three OFDM symbols, the SPDCCH and the SPDSCH use different OFDM symbols in the time division multiplexing way; or the SPDCCH use resources together with the SPSCH in the frequency division multiplexing way only within the short TTI, and resources of the remaining OFDM symbols are used by the SPDSCH.

When the short TTI has a length of a single OFDM symbol, the SPDCCH and the SPDSCH use resources in the frequency division or code division multiplexing way within the short TTI. The frequency division way includes: interlacing to use resources of a single OFDM symbol by taking a single RE or X REs as a unit; or the SPDCCH uses all or a part of even REs or even RE groups, where one RE group includes X REs, and the SPDSCH uses the remaining REs; or the SPDCCH uses all or a part of odd REs or odd RE groups, where one RE group includes X REs, and the SPDSCH uses the remaining REs.

Alternatively, the short TTIs with variable lengths are applied to an uplink subframe simultaneously, that is, a division of the time domain length of each short TTI in the uplink subframe with 1 ms is consistent with the division the time domain length of each short TTI in the downlink subframe with 1 ms.

Alternatively, for carrying feedback information for transmission correctness of a SPUSCH in the SPDCCH or in the SPHICH, the SPHICH may, but is not limited to, perform puncturing transmission in the resources occupied by the SPDCCH or transmission by using a part of the resources independent of the resources occupied by the SPDCCH.

By the method for implementing the short TTIs with variable lengths according to the exemplary embodiment, time domain lengths of multiple TTIs are substantially the same, so that the signaling notification overhead of the TTIs with variable lengths in the exemplary embodiment three is saved, and multiplexing a CFI signaling in the related art completely achieves no increase of any signaling overhead. It is possible to flexibly divide short TTIs with different time domain lengths across different subframes with 1 ms in the related art and ensure that different traffic types or traffic QoS of data packets select approximate short TTIs for transmission, particularly, suitable for smaller traffic burst transmission of the data packets.

Exemplary Embodiment Five

Figure 9:
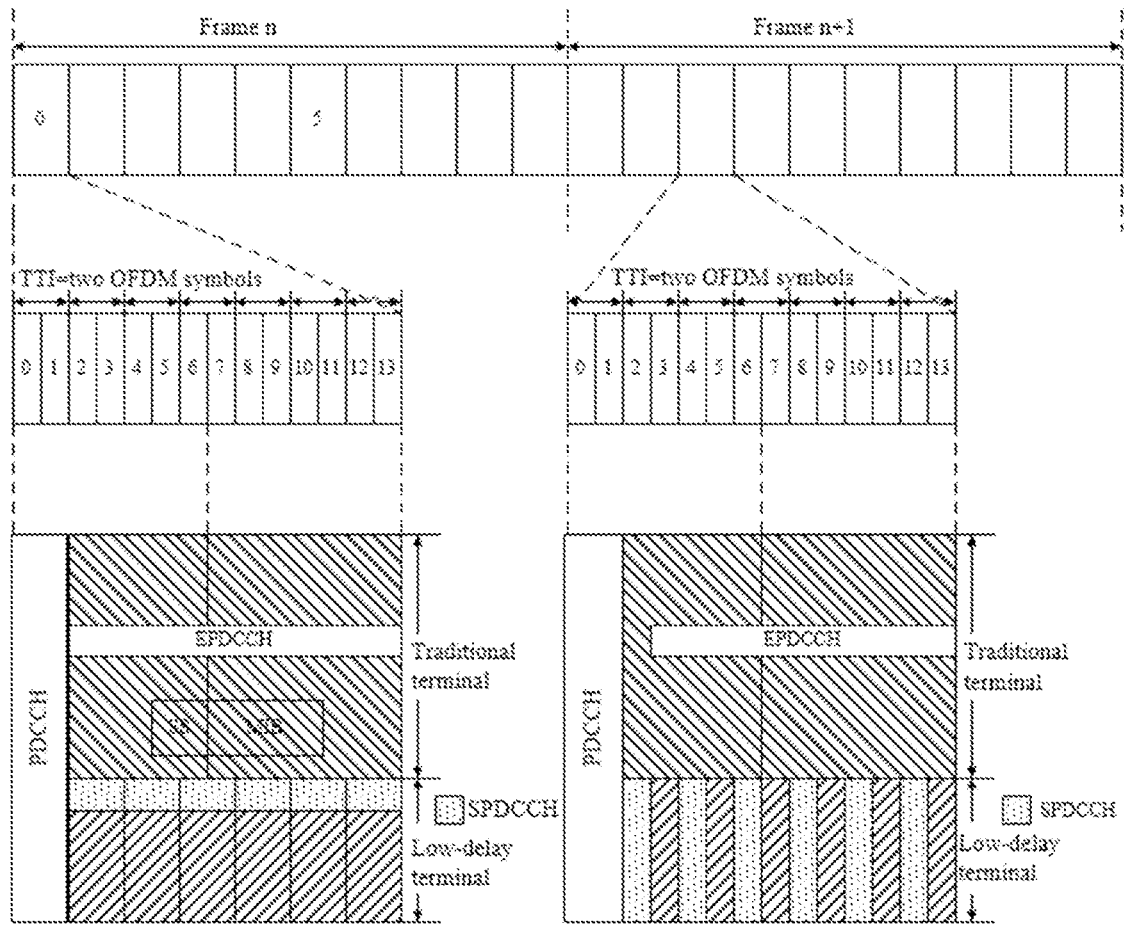
FIG. 9 is a schematic diagram of resource use according to an exemplary embodiment five.

Short TTIs with fixed lengths are supported in a frame structure of LTE. As shown in FIG. 9, the time domain length of the short TTI supported includes 2 OFDM symbols. A base station configures a PDCCH region as one short TTI in a 1-ms subframe, that is, the first short TTI in the 1-ms subframe is formed by a legacy PDCCH region, and the subsequent legacy PDSCH region is used by a traditional terminal and a low-delay terminal in a frequency division way. The resource regions used by the low-delay terminal have the same time domain length between different 1-ms subframes, and the time domain lengths of all the short TTIs within one 1-ms sub-frame are also same. Alternatively, the fixed short TTI is set for the low-delay terminal at this time, which does not change over time.

In the resource region of the low-delay terminal, a SPDCCH and a SPDSCH within a plurality of short TTIs of same time domain length use resources in a time division multiplexing way, a frequency division multiplexing way, a code division multiplexing way, or a time frequency division multiplexing way. As shown in FIG. 9, there are two ways of frequency division multiplexing and time division multiplexing. For example, for the short TTI having a length of two OFDM symbols, the SPDCCH and the SPDSCH respectively use the first OFDM symbol and the second OFDM symbol in the time division multiplexing way; or the SPDCCH, together with the SPSCH, uses RE resources in the two OFDM symbols only within the short TTI in the frequency division multiplexing way; or the SPDCCH uses RE resources in the first OFDM symbol in the frequency division way and the SPDSCH uses resources in the second OFDM symbol. In addition, when the short TTI includes three or more OFDM symbols, a multiplexing way is similar to the above multiplexing way.

When the short TTI has a length of a single OFDM symbol, the SPDCCH and the SPDSCH use resources within the short TTI in the frequency division or code division multiplexing way. The frequency division way includes: interlacing to use resources of the single OFDM symbol by taking a single RE or X REs as a unit; or the SPDCCH uses all or a part of even REs or even RE groups, where one RE group includes X REs, and the SPDSCH uses the remaining REs; or the SPDCCH uses all or a part of odd REs or odd RE groups, where one RE group includes X REs, and the SPDSCH uses the remaining REs.

Alternatively, the short TTIs with fixed lengths are applied to an uplink subframe simultaneously, that is, the time domain length of the short TTI in the uplink 1-ms subframe is the same with the time domain length of the short TTI in the downlink 1-ms subframe.

Alternatively, feedback information for transmission correctness of a SPUSCH is carried in the SPDCCH or in the SPHICH, the SPHICH may, but is not limited to, perform puncturing transmission in the resources occupied by the SPDCCH or transmission by occupying a part of the resources independent of the resources occupied by the SPDCCH.

By the method for implementing the short TTIs with fixed lengths according to this exemplary embodiment, the time domain length of each of TTIs is the same, so that the signaling notification overhead of the TTIs with variable lengths in the exemplary embodiment three and four are saved. It is suitable for scenarios where sizes of traffic packets are relatively fixed, and the traffic packets are transmitted by using the short TTIs, implementation is simple, and it is particularly suitable for smaller traffic burst transmission of the data packets.

Figure 10:
FIG. 10 is a schematic diagram of a downlink control apparatus according to a third embodiment.

A third embodiment, a downlink control apparatus is disposed on a base station, and as shown in FIG. 10, includes a first determination module 31 and a transmission module 32.

The first determination module 31 is configured to determine at least one downlink control channel in a first downlink control channel and a second downlink control channel. The determination includes: determining to use the second downlink control channel in a short transmission time interval (TTI) which is out of a scheduling range of the first downlink control channel, or determining the downlink control channel used in a short TTI according to pre-definition or system configuration information.

The transmission module 32 is configured to transmit downlink control information (DCI) by using the determined downlink control channel.

Alternatively, the pre-definition or system configuration information indicates a case where all short TTIs use the second downlink control channel. The case where all the short TTIs use the second downlink control channel includes at least one of the following: all the short TTIs use the second downlink control channel, a part of the short TTIs uses the second downlink control channel, or all the short TTIs do not use the second downlink control channel.

Alternatively, a part of the short TTIs using the second downlink control channel includes at least one of the following cases: except that the first short TTI or former P short TTIs do not use the second downlink control channel, the remaining short TTIs use the second downlink control channel; except that the first short TTI or former Q short TTIs do not use the second downlink control channel, a part of the remaining short TTIs uses the second downlink control channel; or, the first short TTI uses the second downlink control channel, and a part of the subsequent short TTIs uses the second downlink control channel. Each of P and Q is an integer which is larger than 1 and smaller than R, and R is the number of the short TTIs included by the TTI with the time domain length of 1 millisecond.

Alternatively, the time domain length of the short TTI is predefined or notified by a signaling. The signaling includes any one or more of the following: system information block (SIB) information, a radio resource control (RRC) message, or a physical layer signaling. The physical layer signaling includes at least one of the DCI or control format indication (CFI).

Alternatively, the first downlink control channel is a physical downlink control channel (PDCCH), and the second downlink control channel is a short physical downlink control channel (SPDCCH). The short TTI is a TTI a time domain length of which is smaller than 1 millisecond. The SPDCCH refers to a physical downlink control channel which occupies a part or all of resource elements within the short TTI and has a time domain length being smaller than or equal to the time domain length of the occupied short TTI.

Alternatively, the DCI is used for notifying a terminal of a corresponding traffic receiving way. The traffic receiving way includes at least one of: when the DCI of the terminal is located in the PDCCH, receiving a traffic at the first short TTI, or receiving a traffic at the TTI with the time domain length of 1 ms.

Alternatively, the SPDCCH, within the short TTI where the SPDCCH is located, uses resource elements within the short TTI with a short physical downlink shared channel (SPDSCH) according to any one of the following resource multiplexing ways: time division multiplexing, frequency division multiplexing, code division multiplexing, or time frequency division multiplexing. The SPDSCH refers to a physical downlink shared channel which occupies a part or all of the resource elements within the short TTI and has the time domain length being smaller than or equal to the time domain length of the occupied short TTI.

Alternatively, when the short TTI has a length of a single OFDM symbol, the SPDCCH and the SPDSCH perform resource multiplexing within the short TTI in a frequency division multiplexing way or a code division multiplexing way. The frequency division way includes: using a single OFDM symbol resource in an interlacing way by taking a single RE (Resource Element) or X REs as a unit, where X is a positive integer larger than 1; or using all or a part of even REs or even RE groups for the SPDCCH, where one RE group includes X REs, and using the remaining REs or RE groups for the SPDSCH; or using all or a part of the odd REs or the odd RE groups for the SPDCCH, where one RE group includes X REs, and using the remaining REs or RE groups for the SPDSCH.

Alternatively, the SPDCCH performs resource occupancy by taking a short control channel element (SCCE) as a granularity in an SPDCCH region within the short TTI. The distribution way of the SCCEs in the SPDCCH region includes any one of the following: a time frequency division occupancy, an interlaced occupancy, a frequency division occupancy, a time division occupancy, or a code division occupancy.

The SCCE is a control channel element the time domain length of which is smaller than or equal to the time domain length of the short TTI.

Alternatively, information carried by the SPDCCH includes any one or more of the following: uplink grant (UL grant), downlink grant (DL grant), uplink and downlink joint grant (UL and DL grant), single-terminal acknowledgement/negative acknowledgement feedback information (ACK/NACK), or multi-terminal acknowledgement/negative acknowledgement feedback information (ACK/NACK).

Alternatively, in a subframe, resources except for the PDCCH region are used by terminals with different delay demands according to a frequency division multiplexing way; or, resources in different subframes or radio frames are used by terminals with different delay demands according to a time division multiplexing way.

The terminals with different delay demands may include, but not limited to, a traditional terminal and a low-delay terminal.

Alternatively, at least one of the PDCCH or the SPDCCH is in the same short TTI with the scheduled downlink data information.

The first determination module 31 determines that the second downlink control channel is used in the short TTI which is out of a scheduling range of the first downlink control channel, which includes the following functions.

When the time domain length of the short TTI is larger than or equal to the time domain length of the PDCCH, the first determination module 31 determines that the SPDCCH is used in one or more short TTIs behind the first short TTI including the PDCCH. When the time domain length of the short TTI is smaller than the time domain length of the PDCCH, the first determination module 31 determines that the SPDCCH is used in one or more short TTIs behind the PDCCH region.

Alternatively, the transmission module 32 is further configured to transmit feedback information for transmission correctness of a physical uplink shared channel (SPUSCH) of the short TTI by using a short physical hybrid automatic repeat indicator channel (SPHICH) in the short TTI using the SPDCCH. The SPHICH refers to a physical hybrid automatic repeat indicator channel which occupies all or a part of resource elements in the short TTI and has the time domain length being smaller than or equal to the time domain length of the occupied short TTI. The SPUSCH refers to a physical uplink shared channel which occupies all or a part of resource elements in the short TTI and has a time domain length being smaller than or equal to the time domain length of the occupied short TTI.

The SPHICH performs puncturing transmission in the resources occupied by the SPDCCH, or the SPHICH performs transmission by using a part of resources independent from the resources occupied by the SPDCCH.

Alternatively, a size of an RBG serving as a granularity of resource allocation (RA) used by scheduling the short TTI is larger than or equal to a size of an RBG (that is, the size of the RBG used by the traditional terminal) used by scheduling the TTI with the time domain length of 1 millisecond under the same system bandwidth.

Alternatively, a way of determining a transport block size (TBS) configuration table used by scheduling the short TTI includes that: according to a proportion Y of the time domain length of the short TTI to 1 ms, a TBS in a predetermined TBS configuration table is used to be multiplied by the proportion Y, where 0%<Y<100%; and the product is rounded up or down to obtain the TBS in the TBS configuration table used by scheduling the short TTI.

Alternatively, when the time domain length of the short TTI is 0.5 millisecond, the PDCCH schedules traffic channels in even short TTIs in downlink (DL), the SPDCCH schedules traffic channels in odd short TTIs in DL, and the PDCCH and the SPDCCH schedule uplink (UL) traffics of a subframe n+k. k is any one of the following: 2, 4 or 8, and n is a serial number of the current subframe.

Alternatively, the transmission module 32 is further configured to transmit feedback information for transmission correctness of the SPUSCH of the odd short TTIs by using the SPHICH in the odd short TTIs.

Alternatively, at least one of the PDCCH or the SPDCCH is located in same or different short TTIs with the scheduled downlink data information.

The first determination module 31 determines the downlink control channel used in the short TTI according to the pre-definition or system configuration information, which includes that: the first determination module 31 determines that, in the subframe behind the TTI where the PDCCH is located, each short TTI does not use the SPDCCH, or a part of TTIs uses the SPDCCH, or all the short TTIs use the SPDCCH.

Alternatively, the transmission module 32 is further configured to use the SPHICH in the short TTI which does not contain the PDCCH or in the short TTI outside the PDCCH region. When there is the SPDCCH in the short TTI, the SPHICH performs puncturing transmission in the resources occupied by the SPDCCH, or the SPHICH performs transmission by using a part of resources independent from the resources occupied by the SPDCCH. When there is no SPDCCH in the short TTI, the SPHICH performs transmission by using a part of resources independent from the resources occupied by the SPDSCH, or the SPDSCH carries information of joint encoding feedback information for transmission correctness of the SPUSCH of the short TTI with downlink data of the same terminal, and the information is transmitted in the SPDSCH.

Alternatively, the first determination module 31 determines the downlink control channel used in the short TTI according to the pre-definition or system configuration information, which includes that: when the time domain length of the short TTI is 0.5 millisecond, the first determination module 31 determines that the SPDCCH is not used, and determines whether the SPDSCH occupies even short TTIs or odd short TTIs according to 1 bit predetermined in the DCI in the PDCCH.

When the subframe, the time domain length of which is 1 millisecond, includes x short TTIs, m bits are used to indicate that data scheduled by the SPDCCH or PDCCH is located in one or more short TTIs in the DCI in the SPDCCH or PDCCH, where x is a positive integer, and m≤x.

Alternatively, the transmission module 32 is further configured to, when the time domain length of the short TTI is 0.5 millisecond, use the SPHICH in the odd short TTIs, where the SPHICH only carries feedback information for transmission correctness of the SPUSCH of the odd short TTIs; and when the subframe, the time domain length of which is 1 millisecond, includes x short TTIs, use the SPHICH in all the short TTIs or the short TTIs except the first short TTI in the subframe the time domain length of which is 1 millisecond, where the SPHICH only carries feedback information for transmission correctness of the SPUSCH of all the short TTIs or the short TTIs except the first short TTI in the subframe the time domain length of which is 1 millisecond.

Figure 11:
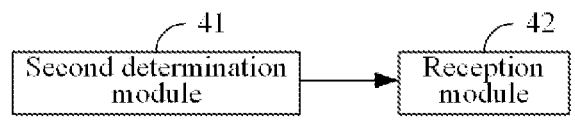
FIG. 11 is a schematic diagram of a downlink control apparatus according to a fourth embodiment.

A fourth embodiment, a downlink control apparatus is disposed on a terminal, and as shown in FIG. 11, includes a second determination module 41 and a reception module 42.

The second determination module 41 is configured to determine at least one downlink control channel in a first downlink control channel and a second downlink control channel. The determination includes that: the second determination module 41 determines that the second downlink control channel is used in a short transmission time interval (TTI) which is out of a scheduling range of the first downlink control channel; or the second determination module 41 determines the downlink control channel used in the short TTI according to pre-definition or system configuration information.

The reception module 42, is configured to receive downlink control information (DCI) by using the determined downlink control channel.

Alternatively, the pre-definition or system configuration information indicates a case where all short TTIs use the second downlink control channel. The case where all the short TTIs use the second downlink control channel includes at least one of the following: all the short TTIs use the second downlink control channel, a part of the short TTIs uses the second downlink control channel, or all the short TTIs do not use the second downlink control channel.

Alternatively, the case where a part of the short TTIs uses the second downlink control channel includes at least one of the following cases: except that the first short TTI or former P short TTIs do not use the second downlink control channel, the remaining short TTIs use the second downlink control channel; except that the first short TTI or former Q short TTIs do not use the second downlink control channel, a part of the remaining short TTIs uses the second downlink control channel; or, the first short TTI uses the second downlink control channel, and a part of the subsequent short TTIs uses the second downlink control channel. Each of P and Q is an integer which is larger than 1 and smaller than R, and R is the number of the short TTIs included by the TTI with a time domain length of 1 millisecond.

Alternatively, a time domain length of the short TTI is predefined or notified by a signaling. The signaling includes any one or more of the following: system information block (SIB) information, a radio resource control (RRC) message, or a physical layer signaling. The physical layer signaling includes at least one of the DCI or a control format indication (CFI).

Alternatively, the first downlink control channel is a physical downlink control channel (PDCCH), and the second downlink control channel is a short physical downlink control channel (SPDCCH). The short TTI is a TTI a time domain length of which is smaller than 1 millisecond. The SPDCCH refers to a physical downlink control channel which occupies a part or all of resource elements within the short TTI and has a time domain length being smaller than or equal to the time domain length of the occupied short TTI.

Alternatively, the apparatus further includes an execution module.

The execution module is configured to execute a corresponding traffic receiving way according to the DCI detected by the reception module. The traffic receiving way includes at least one of: when detecting the DCI of the terminal in the PDCCH, the reception module receives a traffic at the first short TTI; or, when detecting the DCI of the terminal in the PDCCH, the reception module receives the traffic at the TTI with the time domain length of 1 millisecond.

Alternatively, the SPDCCH, within the short TTI where the SPDCCH is located, uses the resource elements within the short TTI with a short physical downlink shared channel (SPDSCH) according to any one of the following resource multiplexing ways: time division multiplexing, frequency division multiplexing, code division multiplexing, or time frequency division multiplexing. The SPDSCH refers to a physical downlink shared channel which occupies a part or all of the resource elements within the short TTI and has a time domain length being smaller than or equal to the time domain length of the occupied short TTI.

Alternatively, information carried by the SPDCCH includes any one or more of the following: uplink grant (UL grant), downlink grant (DL grant), uplink and downlink joint grant (UL and DL grant), single-terminal acknowledgement/negative acknowledgement feedback information (ACK/NACK), or multi-terminal acknowledgement/negative acknowledgement feedback information (ACK/NACK).

Alternatively, at least one of the PDCCH or the SPDCCH is in the same short TTI with scheduled downlink data information.

The second determination module 41 determines that the second downlink control channel is used in the short TTI which is out of a scheduling range of the first downlink control channel, which includes that: when the time domain length of the short TTI is larger than or equal to the time domain length of the PDCCH, the second determination module 41 determines that the SPDCCH is used in one or more short TTIs behind the first short TTI including the PDCCH; and when the time domain length of the short TTI is smaller than the time domain length of the PDCCH, the second determination module 41 determines that the SPDCCH is used in one or more short TTIs behind a PDCCH region.

Alternatively, the reception module 42 is further configured to receive a short physical hybrid automatic repeat indicator channel (SPHICH) in the short TTI using the SPDCCH, and obtain feedback information for transmission correctness of the SPUSCH of the short TTI. The SPHICH refers to a physical hybrid automatic repeat indicator channel which occupies a part or all of resource elements in the short TTI and has a time domain length being smaller than or equal to the time domain length of the occupied short TTI. The SPUSCH refers to a physical uplink shared channel which occupies a part or all of resource elements in the short TTI and has a time domain length being smaller than or equal to the time domain length of the occupied short TTI.

The SPHICH performs puncturing transmission in the resources occupied by the SPDCCH, or the SPHICH performs transmission by using a part of resources independent from the resources occupied by the SPDCCH.

Alternatively, the reception module 42 is further configured to receive the SPHICH in the odd short TTIs, and obtain feedback information for transmission correctness for the SPUSCH of the odd short TTIs.

Alternatively, at least one of the PDCCH or the SPDCCH is located in the same or different short TTIs with the scheduled downlink data information.

The second determination module 41 determines the downlink control channel used in the short TTI according to the pre-definition or system configuration information, which includes that: the second determination module 41 determines that, in the subframe behind the TTI where the PDCCH is located, each short TTI does not receive the SPDCCH, or a part of TTIs receives the SPDCCH, or all the short TTIs receive the SPDCCH.

Alternatively, the reception module 42 is further configured to receive the SPHICH in the short TTI which does not include the PDCCH or in the short TTI outside the PDCCH region. When there is the SPDCCH in the short TTI, the SPHICH performs puncturing transmission in the resources occupied by the SPDCCH, or the SPHICH performs transmission by using a part of resources independent from the resources occupied by the SPDCCH. When there is no SPDCCH in the short TTI, the SPHICH performs transmission by using a part of resources independent from the resources occupied by the SPDSCH, or the SPDSCH carries information of joint encoding feedback information for transmission correctness of the SPUSCH of the short TTI with downlink data of the same terminal, and the information is transmitted in the SPDSCH.

Alternatively, that the second determination module 41 determines the downlink control channel used in the short TTI according to the pre-definition or system configuration information, which includes that: when the time domain length of the short TTI is 0.5 millisecond, the second determination module 41 determines that the SPDCCH is not received, and determines whether the SPDSCH occupies even short TTIs or odd short TTIs according to 1 bit predetermined in the DCI in the PDCCH; when the subframe, the time domain length of which is 1 millisecond, includes x short TTIs, the second determination module 41 determines that data scheduled by the SPDCCH or PDCCH is located in one or more short TTIs in the subframe according to m bits predetermined in the DCI in the SPDCCH or PDCCH, where x is a positive integer, and m≤x.

Alternatively, the reception module 42 is further configured to, when the time domain length of the short TTI is 0.5 millisecond, receive the SPHICH in the odd short TTIs, where the SPHICH only carries feedback information for transmission correctness of the SPUSCH of the odd short TTIs; and when the subframe, the time domain length of which is 1 millisecond, includes x short TTIs, use the SPHICH in all the short TTIs or the short TTIs except the first short TTI in the subframe the time domain length of which is 1 ms, where the SPHICH only carries feedback information for transmission correctness of the SPUSCH of all the short TTIs or the short TTIs except the first short TTI in the subframe the time domain length of which is 1 ms.

A fifth embodiment, a computer-readable storage medium stores a computer-executable instruction, and the computer-executable instruction is used to perform the method according to any one of the above embodiments.

Those ordinarily skilled in the art may understand that all or a part of steps in the above methods may be implemented by a program to instruct relevant hardware, and the program may be stored in the computer-readable storage medium, such as a read-only memory, a magnetic disk, an optical disk, or the like. Alternatively, all or a part of the steps of the above embodiments may also be implemented by using one or more integrated circuits. Correspondingly, the modules/units in the above embodiments may be implemented in the form of hardware, or in the form of software function modules. The embodiments of the present disclosure are not limited to any particular combination of the hardware and the software.

INDUSTRIAL APPLICABILITY

A downlink control scheme proposed in the embodiments of the present disclosure may solve the problem of using a downlink control channel in a short TTI that includes fewer OFDM symbols, and accordingly a shorter RTT may be obtained when a short TTI with a new granularity is used, thereby ensuring the low-delay communication demand.

What is claimed is:

1. A downlink control method, comprising:
    determining, by a base station, at least one downlink control channel in a first downlink control channel and a second downlink control channel, wherein the determining comprises: determining the downlink control channel used in short transmission time intervals (TTIs) according to pre-definition; and
    transmitting, by the base station, downlink control information (DCI) by using the determined downlink control channel;
    wherein the pre-definition comprises a part of the short TTIs uses the second downlink control channel;
    wherein a part of the short TTIs uses the second downlink control channel comprises except that a first short TTI do not use the second downlink control channel, and remaining short TTIs use the second downlink control channel;
    wherein the first downlink control channel is a physical downlink control channel (PDCCH), and the second downlink control channel is a short physical downlink control channel (SPDCCH); each of the short TTIs is a TTI a time domain length of that is smaller than 1 millisecond; and the SPDCCH is a physical downlink control channel that occupies a part of resource elements within the time domain length of one of the short TTIs, and a time domain length of the SPDCCH is smaller than or equal to the time domain length of an occupied short TTI;
    wherein the DCI is used for notifying a terminal of a corresponding traffic receiving way, and the traffic receiving way comprises at least one of: in response to determining that the DCI of the terminal is located in the PDCCH, receiving a traffic at the first short TTI or receiving a traffic at a TTI with the time domain length of 1 millisecond.

2. The method according to claim 1, wherein a time domain length of the short TTI is predefined or notified by a signaling;
    the signaling comprises at least one of: system information block (SIB) information, a radio resource control (RRC) message or a physical layer signaling;
    the physical layer signaling comprising at least one of the DCI or control format indication (CFI).

3. The method according to claim 1, wherein
    the SPDCCH, within the short TTI where the SPDCCH is located, uses resource elements within the short TTI with a short physical downlink shared channel (SPDSCH) according to at least one of: time division multiplexing, frequency division multiplexing, code division multiplexing, or time frequency division multiplexing; and
    the SPDSCH is a physical downlink shared channel that occupies a part or all of the resource elements within the time domain length of the short TTI, and a time domain length of the physical downlink control channel is smaller than or equal to the time domain length of the occupied short TTI.

4. The method according to claim 1, wherein
    at least one of the PDCCH or the SPDCCH is in the same short TTI with scheduled downlink data information; and the determining to use the second downlink control channel in the short TTI that is out of a scheduling range of the first downlink control channel comprises:
determining that the SPDCCH is used in one or more short TTIs behind a PDCCH region.

5. The method according to claim 4, wherein
a size of a resource block group (RBG) serving as a granularity of resource allocation (RA) used by scheduling the short TTI is larger than or equal to a size of a RBG used by scheduling the TTI with the time domain length of 1 millisecond under a same system bandwidth.

6. The method according to claim 4, wherein determining a transport block size (TBS) configuration table used by scheduling the short TTI comprises:
according to a proportion Y of the time domain length of the short TTI to 1 millisecond, multiplying a TBS in a predetermined TBS configuration table by Y, wherein 0%<Y<100%; and
rounding up or down of a product to obtain the TBS in the TBS configuration table used by scheduling the short TTI.

7. The method according to claim 4, wherein
in response to determining that the time domain length of the short TTI is 0.5 millisecond, the PDCCH schedules downlink (DL) traffic channels in even short TTIs, the SPDCCH schedules DL traffic channels in odd short TTIs; and the PDCCH and a SPDCCH schedule uplink (UL) traffics of a subframe n+k, k is at least one of: 2, 4 or 8, n is a serial number of a current subframe.

8. The method according to claim 1, wherein
at least one of the PDCCH or the SPDCCH is located in the same or different short TTIs with a scheduled downlink data information; and
the determining the downlink control channel used in the short TTI according to the pre-definition comprises:
determining that, in a subframe behind the TTI where the PDCCH is located, a part of short TTIs uses the SPDCCH, or all the short TTIs use the SPDCCH.

9. The method according to claim 8, wherein the determining the downlink control channel used in the short TTI according to the pre-definition comprises:
in response to determining that the time domain length of the short TTI is 0.5 millisecond, determining that the SPDCCH is not used; and determining whether a SPDSCH occupies even short TTIs or odd short TTIs according to 1 bit predetermined in the DCI in the PDCCH; and
in response to determining that a subframe, the time domain length of that is 1 millisecond, comprises x short TTIs, indicating that data scheduled by the SPDCCH or PDCCH is located in one or more short TTIs in the subframe by using m bits in the DCI in the SPDCCH or PDCCH, wherein x is a positive integer, and m≤x.

10. A downlink control method, comprising:
determining, by a terminal, at least one downlink control channel in a first downlink control channel and a second downlink control channel, wherein the determining comprises: determining the downlink control channel used in short transmission time intervals (TTIs) according to pre-definition; and
receiving, by the terminal, downlink control information (DCI) by using the determined downlink control channel;
performing, by the terminal, a corresponding traffic receiving way according to the detected DCI;
wherein the pre-definition comprises a part of the short TTIs uses the second downlink control channel;
wherein a part of the short TTIs uses the second downlink control channel comprises except that a first short TTI do not use the second downlink control channel, and remaining short TTIs use the second downlink control channel;
wherein the first downlink control channel is a physical downlink control channel (PDCCH), and the second downlink control channel is a short physical downlink control channel (SPDCCH); each of the short TTIs is a TTI a time domain length of that is smaller than 1 millisecond; and the SPDCCH is a physical downlink control channel that occupies a part of resource elements within the time domain length of one of the short TTIs, and a time domain length of the SPDCCH is smaller than or equal to the time domain length of an occupied short TTI;
wherein the traffic receiving way comprises at least one of: in response to determining that the DCI of the terminal is located in the PDCCH, receiving a traffic at the first short TTI or receiving a traffic at a TTI with the time domain length of 1 millisecond.

11. A downlink control apparatus, that is disposed on a base station and comprises a processor, a storage device and a transmitter, wherein the storage device stores processor-executable programs, and the programs comprise a first determining module;
wherein the first determining module is configured to determine at least one downlink control channel in a first downlink control channel and a second downlink control channel, comprising: determining the downlink control channel used in short transmission time intervals (TTIs) according to pre-definition; and
the transmitter is configured to transmit downlink control information (DCI) by using the determined downlink control channel;
wherein the pre-definition comprises a part of the short TTIs uses the second downlink control channel;
wherein a part of the short TTIs uses the second downlink control channel comprises except that a first short TTI do not use the second downlink control channel, and remaining short TTIs use the second downlink control channel;
wherein the first downlink control channel is a physical downlink control channel (PDCCH), and the second downlink control channel is a short physical downlink control channel (SPDCCH); each of the short TTIs is a TTI a time domain length of that is smaller than 1 millisecond; and the SPDCCH is a physical downlink control channel that occupies a part of resource elements within the time domain length of one of the short TTIs, and a time domain length of the SPDCCH is smaller than or equal to the time domain length of an occupied short TTI;
wherein the DCI is used for notifying a terminal of a corresponding traffic receiving way, and the traffic receiving way comprises at least one of: in response to determining that the DCI of the terminal is located in the PDCCH, receiving a traffic at the first short TTI or receiving a traffic at a TTI with the time domain length of 1 millisecond.

* * * * *